United States Patent
Partee et al.

(10) Patent No.: US 11,378,829 B2
(45) Date of Patent: Jul. 5, 2022

(54) ADVANCED SPATIAL LIGHT MODULATORS, ASSOCIATED SYSTEMS AND METHODS

(71) Applicant: Syght, Inc., Golden, CO (US)

(72) Inventors: Charles C. Partee, Golden, CO (US); Kevin D. McKinstry, Westminster, CO (US); Michael G. Machado, Honokaa, HI (US)

(73) Assignee: Syght, Inc., Golden, CO (US)

( * ) Notice: Subject to any disclaimer, the term of this patent is extended or adjusted under 35 U.S.C. 154(b) by 0 days.

(21) Appl. No.: 16/936,319

(22) Filed: Jul. 22, 2020

(65) Prior Publication Data

US 2021/0026168 A1    Jan. 28, 2021

Related U.S. Application Data

(60) Provisional application No. 62/878,728, filed on Jul. 25, 2019.

(51) Int. Cl.
*G02F 1/09*     (2006.01)
*G02F 1/095*    (2006.01)
(Continued)

(52) U.S. Cl.
CPC .............. *G02F 1/09* (2013.01); *G02F 1/092* (2013.01); *G02F 1/095* (2013.01); *H04N 9/3167* (2013.01);
(Continued)

(58) Field of Classification Search
CPC . G02F 1/09; G02F 1/092; G02F 1/095; G02F 1/0311; G02F 1/0322; G02F 1/035;
(Continued)

(56) References Cited

U.S. PATENT DOCUMENTS

| 4,495,492 A | 1/1985 | Anderson et al. |
| 4,497,545 A | 2/1985 | Ross |

(Continued)

FOREIGN PATENT DOCUMENTS

JP    H07311376 A    *    11/1995    ........... G02F 1/1335

OTHER PUBLICATIONS

Babacan, et al., Compressive Passive Millimeter-Wave Imaging, 2011 18th IEEE Conference on Imaging. A publication month is not of issue since publication at any time in 2011 is sufficiently early.

(Continued)

*Primary Examiner* — George G. King

(74) *Attorney, Agent, or Firm* — Pritzkau Patent Group LLC

(57) ABSTRACT

A spatial light modulator system includes a concentration layer including an array of optical concentrators, such that each concentrator concentrates a portion of an input light beam. A modulation layer includes an array of light modulators each in optical communication with one of the optical concentrators for modulating the portion of the input light beam. The light modulators are spaced apart from one another in the modulation layer to form gaps between adjacent ones of the light modulators. A coil of each light modulator can surround a Faraday element or core containing a Faraday material to control a magnetic state of a Faraday material responsive to control signals.

33 Claims, 17 Drawing Sheets

(51) Int. Cl.
*H04N 9/31* (2006.01)
*G02B 3/00* (2006.01)
*G02F 1/03* (2006.01)
*G02F 1/035* (2006.01)
*H04N 5/225* (2006.01)

(52) U.S. Cl.
CPC ............ *G02B 3/0056* (2013.01); *G02F 1/035* (2013.01); *G02F 1/0311* (2013.01); *G02F 1/0322* (2013.01); *G02F 2201/18* (2013.01); *G02F 2203/07* (2013.01); *G02F 2203/12* (2013.01); *H04N 5/2253* (2013.01)

(58) Field of Classification Search
CPC ............ G02F 2201/18; G02F 2203/07; G02F 2203/12; H04N 9/3167; H04N 5/2253; G02B 3/0056
See application file for complete search history.

(56) References Cited

U.S. PATENT DOCUMENTS

| | | | |
|---|---|---|---|
| 4,550,389 A * | 10/1985 | Cox | G11C 11/14 365/10 |
| 4,550,983 A | 11/1985 | Ross | |
| 4,563,236 A | 1/1986 | Ross et al. | |
| 4,578,321 A | 3/1986 | Ross et al. | |
| 4,661,809 A | 4/1987 | Anderson et al. | |
| 5,048,937 A * | 9/1991 | Takeda | G02F 1/092 359/301 |
| 5,604,607 A | 2/1997 | Mirzaoff | |
| 5,666,226 A * | 9/1997 | Ezra | G02F 1/133526 348/E3.015 |
| 6,768,873 B1 | 7/2004 | Palese | |
| 7,835,600 B1 | 11/2010 | Yap et al. | |
| 8,855,431 B2 | 10/2014 | Donoho | |
| 8,941,431 B2 | 1/2015 | Granhaug et al. | |
| 10,345,631 B1 | 7/2019 | Partee et al. | |
| 10,698,290 B2 | 6/2020 | Partee | |
| 10,747,032 B1 | 8/2020 | Partee et al. | |
| 2004/0085613 A1 | 5/2004 | Lassar | |
| 2004/0190107 A1 | 9/2004 | Hiironen et al. | |
| 2012/0006382 A1 | 1/2012 | Dagli et al. | |
| 2013/0050775 A1 | 2/2013 | Curry et al. | |
| 2013/0257646 A1 | 10/2013 | Gopalsami et al. | |
| 2014/0063332 A1 | 3/2014 | Miyawaki | |

OTHER PUBLICATIONS

Heidari, et al., A 2D Camera Design with a Single-pixel Detector, 2009 34th International Conference on Infrared, Millimeter, and Terahertz Waves. A publication month is not of issue since publication at any time in 2009 is sufficiently early.

Spinoulas, et al., Optimized compressive sampling for passive millimeter-wave imaging, published Sep. 7, 2012.

The International Search Report and Written Opinion for PCT Application No. PCT/US2020043352, which is related to U.S. Appl. No. 16/936,319, Daejeon, Republic of Korea, Nov. 5, 2020.

Uzi Efron, Spatial Light Modulator Technology Materials, Devices and Applications; pp. 361-371, copyright 1995.

Applicant's Response to the International Search Report and Written Opinion for PCT Application PCT/US2020043352, which is related to U.S. Appl. No. 16/936,319, Apr. 12, 2021.

The International Search Report and Written Opinion for PCT Application PCT/US2020043353, which is related to U.S. Appl. No. 16/936,340, Daejeon, Republic of Korea, Nov. 9, 2020.

The International Preliminary Report on Patentability for PCT Application PCT/US2020043352, which is related to U.S. Appl. No. 16/936,319, filed Jul. 29, 2021.

* cited by examiner

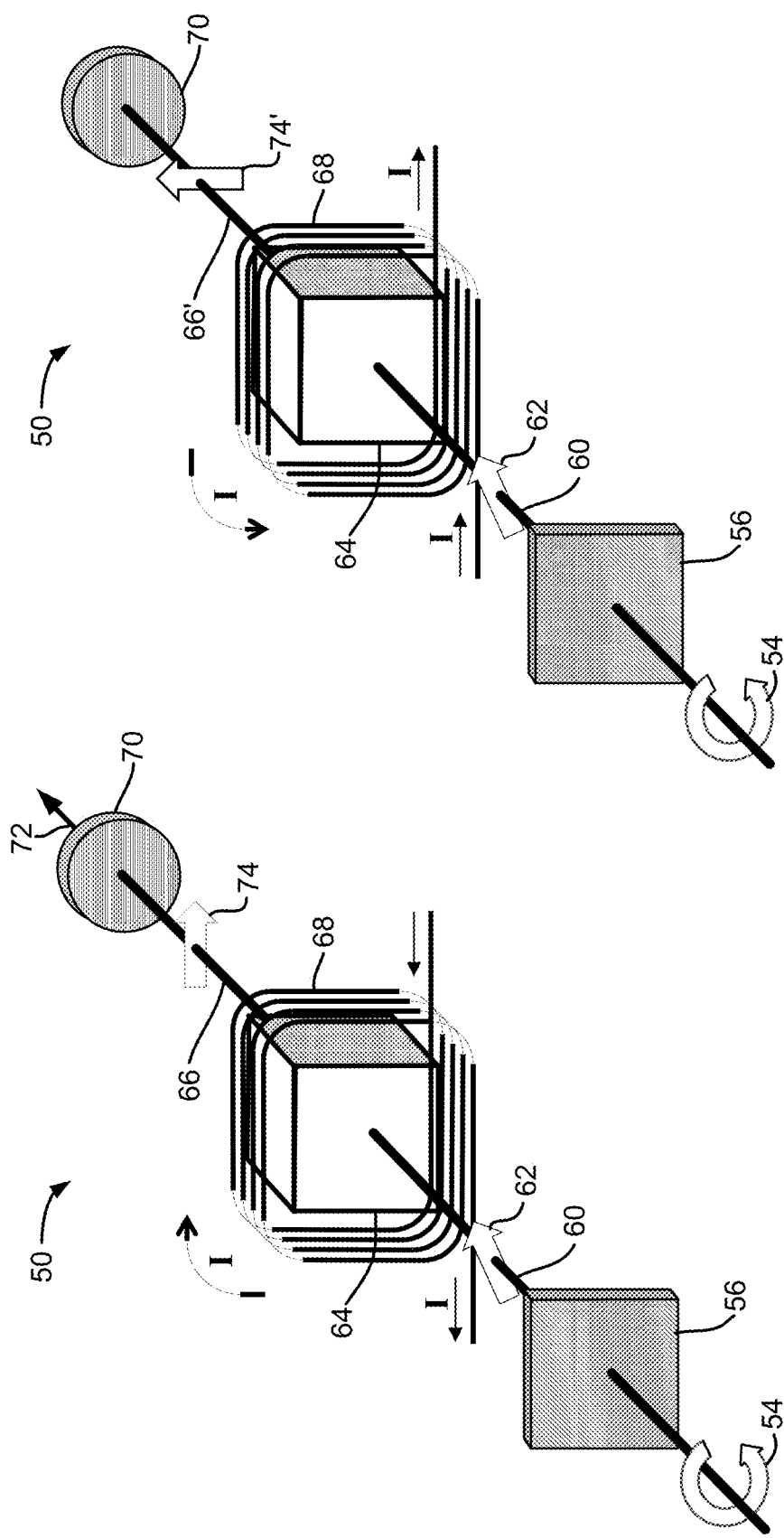

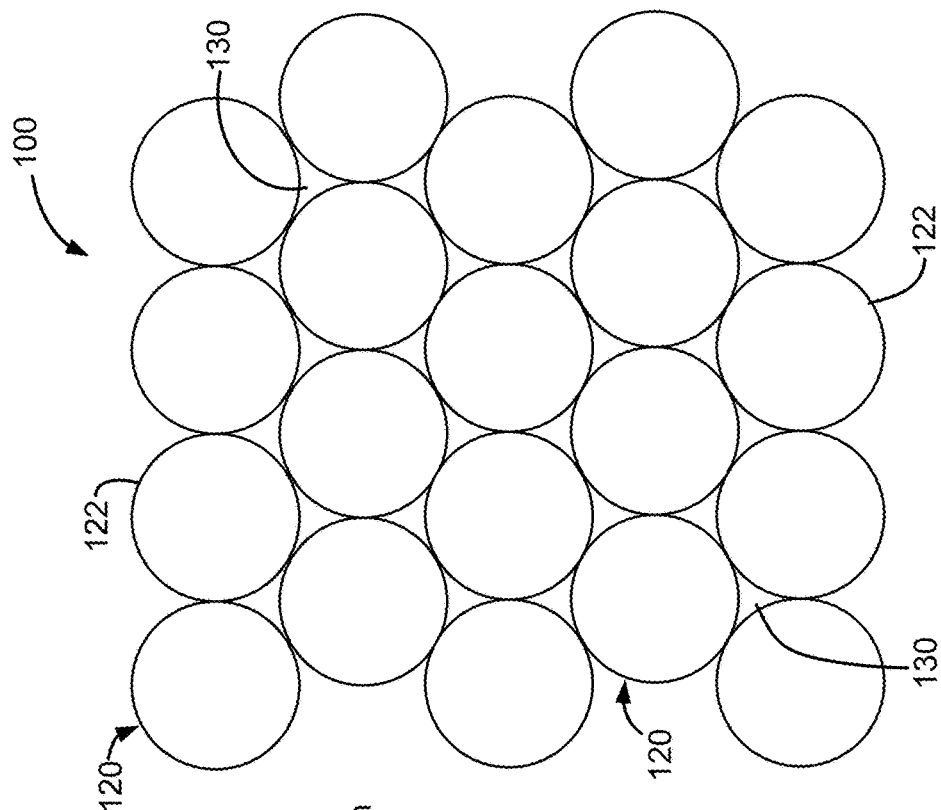
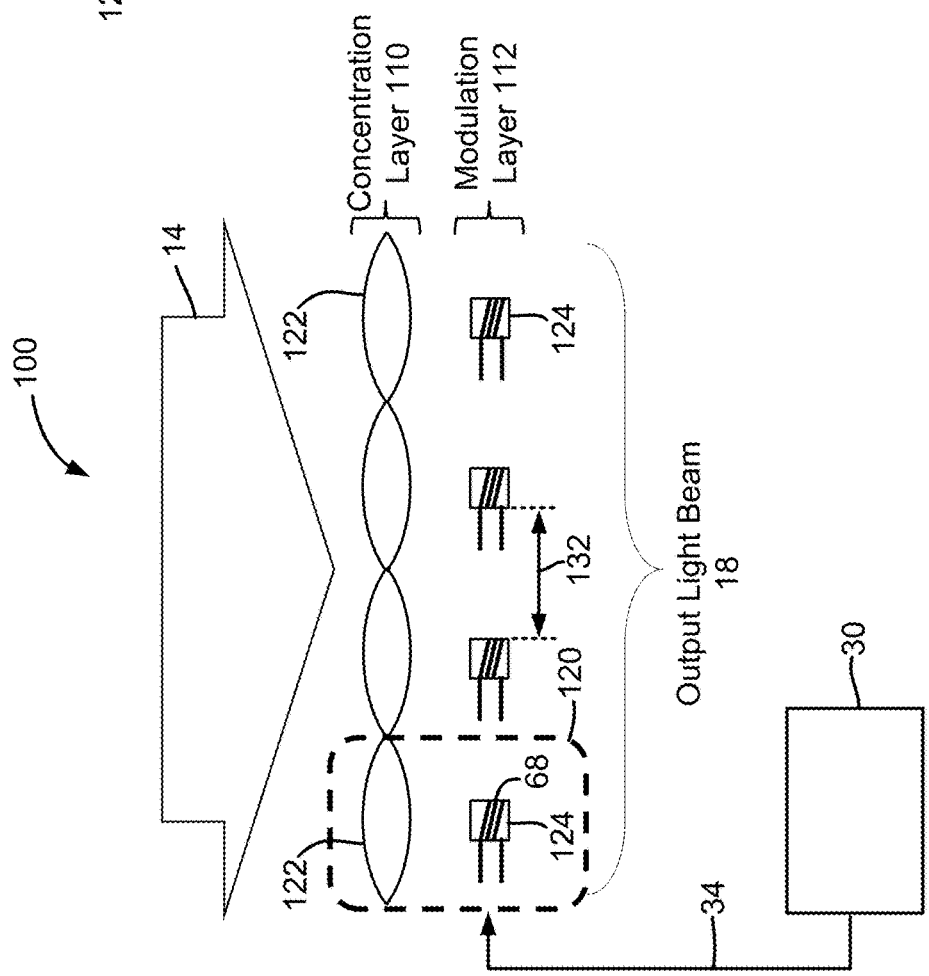
Figure 3b
Figure 3a

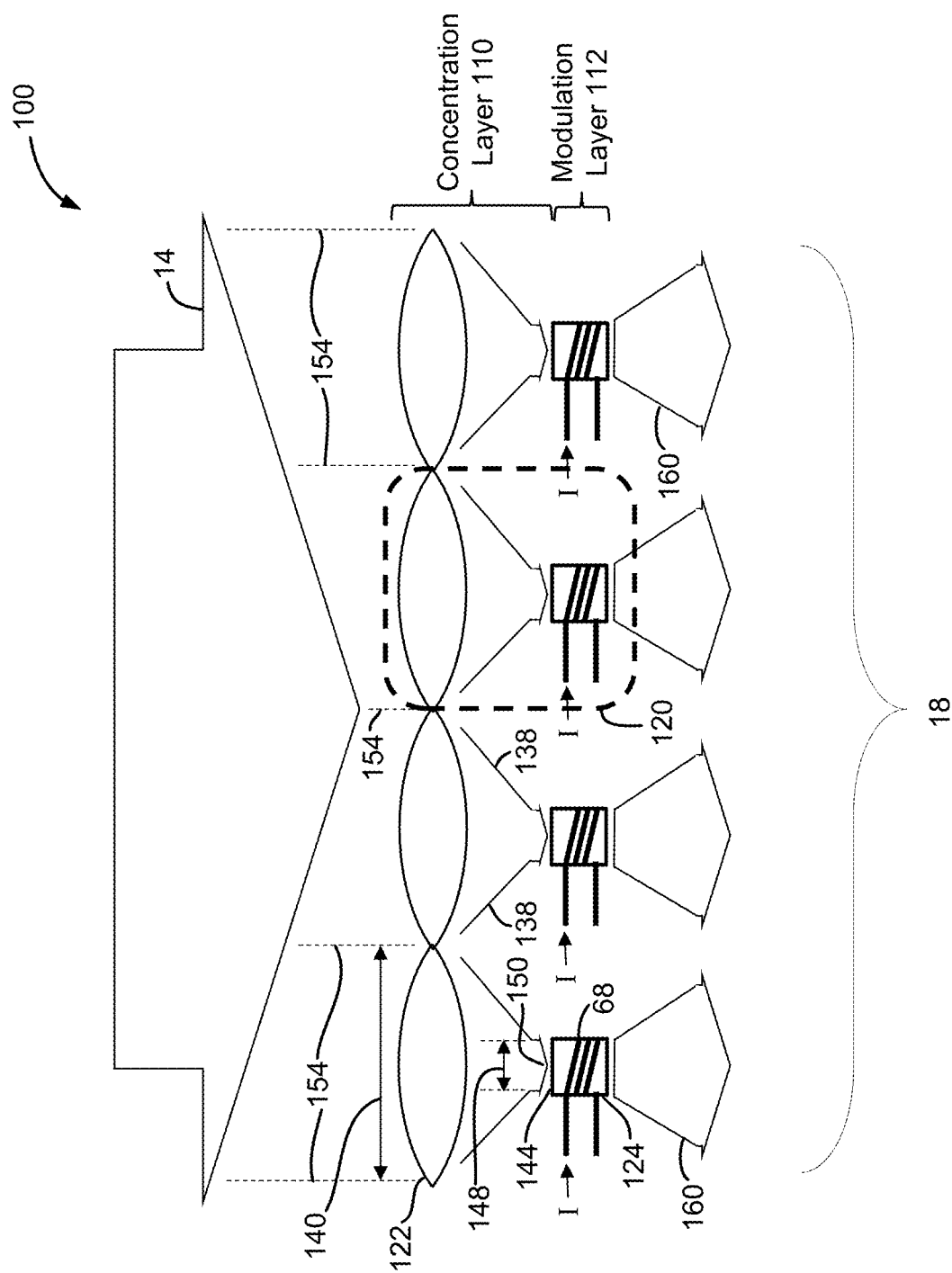

ADVANCED SPATIAL LIGHT MODULATORS, ASSOCIATED SYSTEMS AND METHODS

RELATED APPLICATION

The present application claims priority from U.S. Provisional Patent Application Ser. No. 62/878,728 filed on Jul. 25, 2019 and which is incorporated herein by reference in its entirety.

STATEMENT REGARDING FEDERALLY SPONSORED RESEARCH OR DEVELOPMENT

This invention was made with Government support under Grant No. 1852971, awarded by the National Science Foundation. The Government has certain rights in this invention.

BACKGROUND

The present invention is generally related to the field of the modulation of light and, more particularly, to the spatial modulation of light through the use of advanced spatial light modulators, associated systems and methods. Applicants recognize that it is well known in the art that Spatial Light Modulators (SLMs) receive an incoming beam of light and modify one or more characteristics of the light as a function of the cross-sectional position within the beam of light. The amount of modification and type of characteristic(s) modified can change with respect to time as well as with respect to position within the beam; this is frequently referred to as modulation. Some example types of characteristics that can be changed in modulating the beam of light are amplitude (intensity), phase, and polarization. Modulation frequently is controlled by electrical signals that are supplied to the SLM. It should be noted that the term 'light' used throughout this application refers to electromagnetic radiation or Electro-Magnetic Waves (EMW). In some other documentation, the term 'light' may be used to only refer to EMW in the visible spectrum. That is not the case in this application; herein the term 'light' refers to EMW anywhere in the frequency/wavelength spectrum.

Applicants observe that SLMs are frequently comprised of an array of individual modulators. The array of individual modulators can be one-dimensional (1D) or two-dimensional (2D), with each individual modulator setting the amount of modulation for the light passing through that individual modulator's particular cross-sectional area of the beam. Applicants note that most SLMs used in imaging applications are a two-dimensional (2D) array of individual modulators and the particular cross-sectional area of the beam controlled by a modulator is generally referred to as a pixel. Individual modulators within an array may be referred to as Pixel Modulator or (PM.)

Applicants note that Spatial Light Modulators (SLMs) for the visible spectrum are well-known within the art and there are several well-known technologies used to implement Pixel Modulators (PMs) within the array of PMs for visible spectrum SLMs. These technologies include arrays of MEMS mirrors, LCD and magneto-optic modulators. Applicants note that there is currently considerable interest in optics with longer wave-length light such as 100 μm terahertz spectrum and the millimeter wave 30 GHz to 300 GHz spectrum. These longer wavelengths present special challenges to the manufacture of SLMs which embodiments of the advanced spatial light modulator system described herein solves.

Attention is now directed to FIG. 1a which is a diagrammatic view, in perspective, that illustrates a prior art spatial light modulator generally indicated by the reference number 10 as well as providing an overview of the basic aspects of its operation. An input light beam 14 enters SLM 10 and is modulated by the SLM to produce an output light beam 18 with propagation indicated using block arrows. As depicted, input light beam 14 is smaller in lateral extents than a modulator array 20 such that input light beam 14 forms a spot 24 on the surface of the modulator array. The modulation of the input light beam is controlled by an SLM controller 30 which generates control signals on a plurality of control lines 34 that are represented as an arrow. Applicants observe that in many (and likely most) embodiments of SLM controller 30 include electronic circuitry to drive SLM modulator array 20 as well as a computer to organize these signals to facilitate setting the spatial pattern that the SLM will modulate. The SLM depicted in FIG. 1a includes a two-dimensional (2D) array of 36 individual modulators that each modulate a portion of the input light beam passing through that individual modulator. These individual modulators are referred to as pixel modulators (PMs) and the portion of the input light beam they control is referred to as a pixel. Several of the pixel modulators are designated by the reference number 40. The array depicted is organized as a 6×6 array, i.e. 6 rows of 6 PMs within each row.

FIG. 1b is a diagrammatic view, in perspective, that further illustrates the operation of spatial light modulator 10. In this depiction, SLM controller 30 is now controlling the SLM so that pixel modulators (PMs) 40 are modulating input light beam 14 to attenuate the intensity to different levels. In the depiction, the surface of each PM is darkly patterned to indicate high attenuation for that pixel. PMs that attenuate the least or comparatively not at all are not patterned. Accordingly, it is apparent that SLM controller 30 has configured the PMs of the array so that all but 8 of the PMs will attenuate a minimum amount. The remaining 8 PMs are configured to attenuate a maximum amount which, in this embodiment, effectively blocks the light. These 8 Off PMs are arranged to form the letter 'C'. Modulated output light beam 18 is directed to illuminate a screen 44 whereupon the modulated pattern becomes visible.

Applicants recognize that one well known approach to modulating light is to use magneto-optics, in which magnetic fields affect a material such that the interaction of the material with electromagnetic waves passing through the material changes in response to changes in the magnetic field. One example of such materials is Faraday materials which can alter the polarization of electromagnetic waves passing through and which, in response to the magnetic field in the material, can change the amount of polarization alteration. One example of a prior art magneto-optic SLM is described in U.S. Pat. No. 4,550,389 issued to Cox, et al (hereinafter Cox). Cox describes an SLM including an array of magnetic domain elements, with wires running along the columns and rows. Driving electrical currents through the wires can determine the magnetization state of each element. Passing electromagnetic waves (light) through such an SLM, as well as through some additional optical elements such as, for example, polarizers, allow the SLM to modulate the intensity of the light and form an image.

Faraday rotators are widely known in the art and commonly use Faraday materials to modulate the amplitude of electromagnetic waves (EMW). Faraday rotators are also widely used in telecommunications and laser applications. In the magneto-optic Faraday effect, the direction of the EMW polarization rotation depends on the dot product of the EMW propagation vector and the magnetic flux. In the ferromagnetic Faraday effect, the direction of EMW polarization depends on the dot product of the EMW propagation and material magnetization vectors. In either case, the magnetization direction of the material can be controlled, such as with an applied external magnetic field which, in turn, can be determined, for example, by the direction and magnitude of an electrical current around the Faraday material. In one embodiment, the Faraday material and dimensions are chosen to rotate the polarization of the EMW approximately +45° or −45° by changing the direction of the magnetization in the Faraday material. In other embodiments, design considerations may result in more or less polarization rotation. The magnetization direction of the material can be controlled using an external magnetic field. This external field can be applied to the Faraday material by a combination of magnetic materials (hard and/or soft) and electrical currents. The apparatus to apply the external field can be as simple as passing current through a wire near the Faraday material.

The foregoing examples of the related art and limitations related therewith are intended to be illustrative and not exclusive. Other limitations of the related art will become to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

In general, spatial light modulators, associated systems and methods are described. In one aspect of the disclosure, an embodiment of a spatial light modulator system includes a concentration layer including an array of optical concentrators, each optical concentrator including a concentrator input area and a concentrator output area that is smaller than the concentrator input area such that each concentrator concentrates a portion of an input light beam received at the concentrator input area into the concentrator output area. A modulation layer includes an array of light modulators with each light modulator having a modulator input area that is supported in optical communication with the concentrator output area of one of the optical concentrators for modulating the portion of the input light beam and the light modulators are spaced apart from one another in the modulation layer based on a ratio of the concentrator input area to the modulator input area to form gaps between adjacent ones of the light modulators in the array of light modulators.

In another aspect of the disclosure, an embodiment of a spatial light modulator system includes a concentration layer having an array of optical concentrators, each optical concentrator including a concentrator input area and a concentrator output area that is smaller than the concentrator input area such that each concentrator concentrates a portion of an input light beam received at the concentrator input area into the concentrator output area. A modulation layer includes an array of light modulators with each light modulator including a modulator core including a Faraday material having first and second opposing ends and a coil surrounding each modulator core for producing a magnetic flux through the Faraday material to control a magnetic state of the Faraday material responsive to control signals, each light modulator having a modulator input area that is supported in optical communication with one of the optical concentrators for modulating the portion of the input light beam.

In another aspect of the disclosure, an embodiment of a light modulator includes a Faraday element or core including a Faraday material for selectively changing the polarization of an input light. An electrically conductive coil surrounds the Faraday element or core for controlling a magnetic state of the Faraday element responsive to control signals that select an amount of polarization rotation of the input light.

BRIEF DESCRIPTIONS OF THE DRAWINGS

Example embodiments are illustrated in referenced figures of the drawings. It is intended that the embodiments and figures disclosed herein are to be illustrative rather than limiting.

FIGS. 2a and 2b are diagrammatic views, in perspective, depicting a prior art pixel modulator (PM) and its operation. The PM is a magneto-optical modulator employing the Faraday effect in accordance with the prior art.

FIG. 3a is a diagrammatic view, in elevation, illustrating an embodiment of an advanced spatial light modulator system implemented in accordance with the present disclosure.

FIG. 3b is a diagrammatic plan view illustrating the appearance of one embodiment of the system of FIG. 3a.

FIG. 3c is another diagrammatic view, in elevation, of the system of FIG. 3a illustrating further details of its operation.

DETAILED DESCRIPTION

Figure 1A:
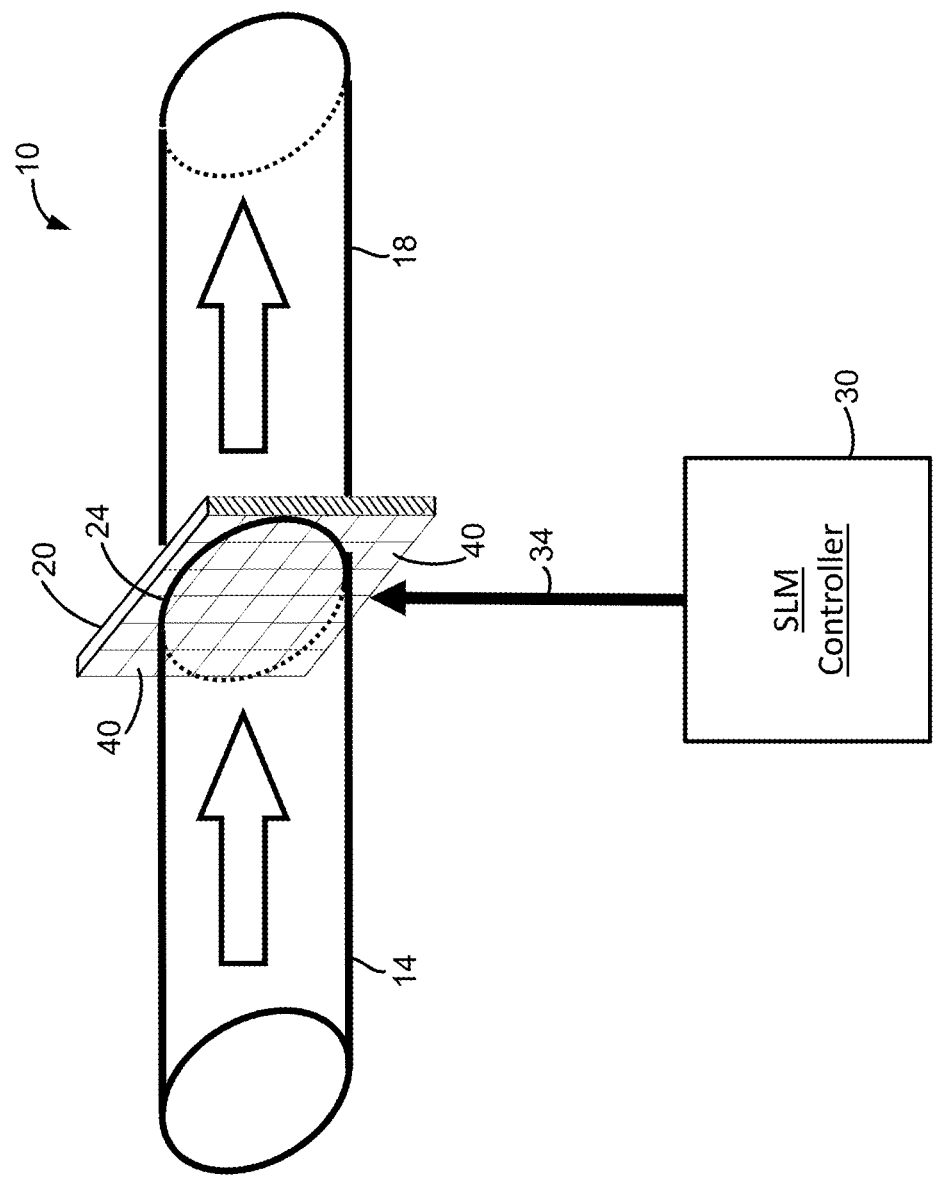
FIG. 1a is a diagrammatic view, in perspective, of a light beam passing through a prior art spatial light modulator.

The following description is presented to enable one of ordinary skill in the art to make and use the invention and is provided in the context of a patent application and its requirements. Various modifications to the described embodiments will be readily apparent to those skilled in the art and the generic principles taught herein may be applied to other embodiments. Thus, the present invention is not intended to be limited to the embodiment shown, but is to be accorded the widest scope consistent with the principles and features described herein including modifications and equivalents, as defined within the scope of the appended claims. It is noted that the drawings are not to scale and are diagrammatic in nature in a way that is thought to best illustrate features of interest. Descriptive terminology such as, for example, upper/lower, right/left, top/bottom and the like may be adopted for purposes of enhancing the reader's understanding with respect to describing the mutual orientations and relationships of components, with respect to the various views provided in the figures, and is in no way intended as being limiting.

Applicants hereby describe embodiments of an advanced spatial light modulator system. Embodiments of the advanced spatial light modulator (SLM) system described herein provide advantages over the existing state-of-the-art, especially at frequencies that are lower than the frequencies of the visible spectrum. In this regard, Applicants observe that much of the present-day art of SLMs is directed to visible light. Embodiments of the advanced SLM systems brought to light herein support operation with electromagnetic waves (EMW) over a range of frequencies from 10 GHz to 10 THz (millimeter wave to terahertz spectrum), as well as over a range of frequencies from 30 GHz to 300 GHz (millimeter wave), enabling practical and low-cost implementation of imaging systems in these frequency ranges. Applicants further note, however, that the teachings herein are applicable to other bands of the electromagnetic spectrum, both at frequencies higher (shorter wavelength) than the visible spectrum and at frequencies lower (longer wavelength) than the visible spectrum.

Attention is now directed to FIG. 2a which diagrammatically illustrates an embodiment of a Faraday-Rotator modulator (FRM), in perspective and generally indicated by the reference number 50, that can be used in an array of pixel modulators (PMs) to form a spatial light modulator in accordance with the present disclosure. A portion 54 of the input light beam enters FRM 50 by initially passing through an input polarizer 56. Portion 54 can be of known or unknown polarization and may be polarized, unpolarized, or partially polarized. For purposes of illustration, portion 54 is depicted as circularly polarized in the figure, shown via the expedient of an arcuate arrow. Leaving input polarizer 56, resulting light 60 is now of known polarization. For purposes of illustration, input polarizer 56 is assumed to be oriented such that the resulting light is at a polarization angle relative of 45° relative to vertical as indicated by an arrow 62. The actual angle depends on many design parameters of the PM, such as the characteristics of the Faraday material, the physical shape and dimensions of the Faraday material which can be referred to as a Faraday element, the characteristics of any magnetic structure(s) associated with the Faraday element, and so on. Polarized light 60 is then passed through a Faraday element 64 becoming an output light beam 66. Faraday element 64 is surrounded by a coil 68 through which a current I passes in a clockwise direction. Generally, the coil can be cylindrical in configuration, although this is not a requirement and any suitable shape can be used. The current establishes a magnetic field through the Faraday material of the Faraday element which, in turn, rotates the polarization of polarized light 60 passing through. Output light beam 66 can enter an output polarizer 70. For purposes of illustration, the output polarizer is assumed to be oriented such that it blocks vertically polarized light and passes horizontally polarized light (oriented at an angle of 90° from vertical). The actual orientation angle of output polarizer 70 is part of the system design that must take into account many design parameters, some of which are listed above. Output light 72 leaving the output polarizer is intensity modulated with the intensity depending on the angle of polarization of the light entering relative to the orientation of the output polarizer. The intensity of output light 72 can then be measured by a detector (not shown) or used in some other fashion such as displayed on a screen as illustrated in FIG. 1b. In some embodiments, the function of the output polarizer can be performed by the detector such that a separate output polarizer is not needed.

Still referring to FIG. 2a, when current I is passed through coil 68 in a clockwise fashion, as indicated by an arrows labeled 'I', the applied magnetic field will be into the plane of the paper and hence the Faraday material in the Faraday element will be magnetized into the plane of the paper. This causes the polarization of the light passing through the Faraday element to be rotated in the positive direction. In this embodiment, the strength of the magnetic field, the characteristics of the Faraday material and the specifics of the Faraday element cause the polarization to rotate +45°. Accordingly, light beam 66 exiting the Faraday element, in this embodiment, is polarized 45°+45°=90°, as indicated by an arrow 74 such that light beam 66 aligns with the polarization of output polarizer 70 to pass through the polarizer thereby producing a maximum output signal.

FIG. 2b is another diagrammatic illustration, in perspective, of FRM 50 of FIG. 2a that is the same as FIG. 2a with the exception that current I is passed through the coil in a counter-clockwise direction. In this way, the applied magnetic field will be out of the plane of the paper and hence the Faraday material in the Faraday element is magnetized out of the plane of the paper causing the polarization of the light passing through the Faraday element to be rotated in the opposite or negative direction. In this case, the polarization of an output light beam 66' leaving the Faraday element is 45°−45°=0° as indicated by an arrow 74'. This orientation is transverse to the polarization of output polarizer 70 such that output light beam 66' is blocked by the output polarizer producing a minimum output signal. It is noted that the polarization rotation provided by the Faraday element is not required to be exactly ±45° such that the two polarizations are exactly 90° apart relative to each other. Sufficient SNR can be achieved with a non-uniform magnetization of the Faraday element and with polarization rotations of less or greater than 45° or greater or less than −45°, such as ranges between 35° to 55° for one magnetic orientation or −35° to −55° for the opposite magnetic orientation. Further, such 90° out of phase orientations can be generated by producing rotations of 0° and 90° or 10° and 100° and so forth. Accordingly, in this embodiment, the relative difference in polarization angle between light beam 66 and light beam 66' can be at least approximately 90° to produce the largest difference signal.

Any material with a non-zero Verdet constant, or which possesses a ferromagnetic moment, and is sufficiently transmissive at a frequency of interest can be used as the Faraday material. By way of illustration, and without limitation, garnet materials can be chosen since the material properties can be modified by adding dopants to control their properties, such as Verdet constant, magnetostriction, magnetic moment, among others. In one embodiment, yttrium iron garnet can be utilized. In another embodiment, gadolinium iron garnet can be utilized. In still another embodiment, bismuth-doped gadolinium iron garnet can be utilized. For the millimeter wave regime, ferrites show an appropriate Faraday response.

FIG. 3a is a diagrammatic view, in elevation, of an advanced spatial light modulator system produced in accordance with the present disclosure and generally indicated by the reference number 100. It is initially noted that like reference numbers may be applied to like components and features throughout the various figures. SLM system 100 includes a concentration layer 110 and a modulation layer 112 with input light beam 14 initially incident on concentration layer 110. Concentration layer 110 and modulation layer 112 cooperate to modulate input light 14 to produce output light beam 18. SLM controller 30 provides control/drive signals 34 to modulation layer 112. An advanced pixel modulator (APM) 120, shown within a dashed rectangle, is made up of a concentrator 122 in concentration layer 104 and a light modulator 124 in modulation layer 112. Thus, the concentration layer is made up of an array of concentrators 122 and the modulation layer is made up of an array of light modulators 124. In FIG. 3a, one row of four advanced pixel modulators is illustrated, however, any suitable number of advanced pixel modulators can be used as part of an overall array of advanced pixel modulators. In this embodiment, the modulators are magneto-optic modulators. By way of non-limiting example, one suitable choice of material for the Faraday element of a magneto-optic modulator operating over the mm wavelength part of the spectrum is a ferrite, such as TDK FB3N or Fair-Rite 61.

FIG. 3b is a diagrammatic plan view of advanced SLM system 100, illustrating an array of advanced pixel modulators 120 (several of which are individually designated with only concentrators 122 visible in the view of the figure. The array includes 5 rows of 4 advanced pixel modulators, although the array can be configured with any suitable number of rows and columns. With additional reference to FIG. 3a, input light beam 14 enters the SLM system into the plane of the diagram of FIG. 3b, passes through concentration layer 110 and is modulated by the modulators of the modulation layer, and leaves as output light beam 18.

In FIG. 3a, it can be seen that, in the present non-limiting embodiment, each concentrator 122 includes a convex refractive lens which concentrates a portion of input light beam 14 for incidence upon the associated light modulator 124. Concentrators 122 are formed from a material that, over the frequency range that the light modulator operates, is transparent and has a refractive index significantly larger than that of air. One suitable choice of material for refractive concentrators for an SLM operating over the millimeter wavelength part of the spectrum is Alumina, although any suitable material can be used. As can be observed in FIG. 3b, circular-shaped concentrators 122 do not completely fill the surface of the concentration layer and leave gaps 130 at the boundaries of the individual concentrators. Portions of the input light beam 14 that happen to enter the SLM system where a gap 130 is present serve to reduce the efficiency of the SLM system. In the embodiment shown in FIG. 3b, the area lost to gaps 130 has been reduced by arranging concentrators 122 such that even rows are offset relative to odd rows. In some embodiments, gaps 130 can at least essentially be eliminated by choosing a peripheral outline shape in the view of FIG. 3b for each concentrator that tiles a surface efficiently such as, for example, a hexagonal shape. In such an embodiment, the circularly symmetric surface of a concentrator lens can be continued into the corners of the hexagon. In some embodiments the concentrator layer need not be comprised of individual concentrators joined together. Instead, the concentrator layer can be one contiguous or integral piece of refractive material with the surface appropriately shaped. In one such embodiment, the concentrator layer can be flatter and use less material by shaping the surface to form Fresnel lenses rather than one continuous smooth shaped surface. It is noted that interstitial gaps 132 between adjacent modulators in the array of the modulation layer are controllable, as will be seen in the discussions which follow.

FIG. 3c is another diagrammatic view, in elevation, of spatial light modulator system 100, provided here to illustrate additional details of its operation. Again and as is the case with FIG. 3a, only one row of four advanced pixel modulators 120 is shown. Each concentrator 122 gathers the light that enters and directs the light toward a focal point (not shown), however, concentration is diagrammatically shown using lines 138. The light for each concentrator 122 enters a concentrator input aperture 140 having an input aperture size which can be used to determine the area of the concentrator input aperture. In the case of a circular lens, the concentrator input aperture size is the diameter, from which the area can be determined. In the case of a non-circular input aperture, an equivalent diameter can be used that corresponds to the area of the non-circular input aperture. Likewise, each light modulator 124 includes a modulator aperture 144 having a modulator aperture size 148. Note that the modulator aperture size is less that the concentrator aperture size to provide for interstitial gaps 132 (FIG. 3a). The size of a concentrator output aperture 150 can be at least approximately matched to or somewhat smaller than the size of the associated modulator input aperture 144 for emitting concentrated light into the associated light modulator 124. Thus, each concentrator input aperture 140 defines a cross-sectional portion of the input light beam that is captured by that specific concentrator. In FIG. 3c, four portions of the input light beam, one for each advanced pixel modulator, are delineated by five vertical dotted lines 154.

In the embodiment illustrated, modulation can be accomplished using magneto-optic modulators. The operation of such a magneto-optic modulator is illustrated in FIGS. 2a and 2b and generally described above. SLM controller 30 (FIG. 3a) determines the amount of polarization rotation needed for each pixel and sends appropriate SLM control signals 34 to each light modulator 122 which causes the appropriate amount of current I to pass through each magneto-optic modulator coil. Accordingly, each magneto-optic modulator applies an appropriate amount of polarization rotation to each portion of input light beam 14. Leaving each magneto-optic modulator 124, portions 160 of modulated light combine as parts of output light beam 18.

Having described FIG. 3c in detail, it is worthwhile at this juncture to summarize at least some of the benefits of the disclosed technology. In particular, the concentrator input aperture size as well as the concentrator output aperture size are set by the concentration layer while the modulator input aperture size is set by the modulation layer, thereby allowing the concentrator input aperture and the modulator input aperture to be of different sizes and still capture all or at least a substantial portion of the energy of input light beam 14. Insofar as gaps between the concentrators, Applicants have disclosed techniques above to eliminate or at least reduce such gaps.

Figure 1B:
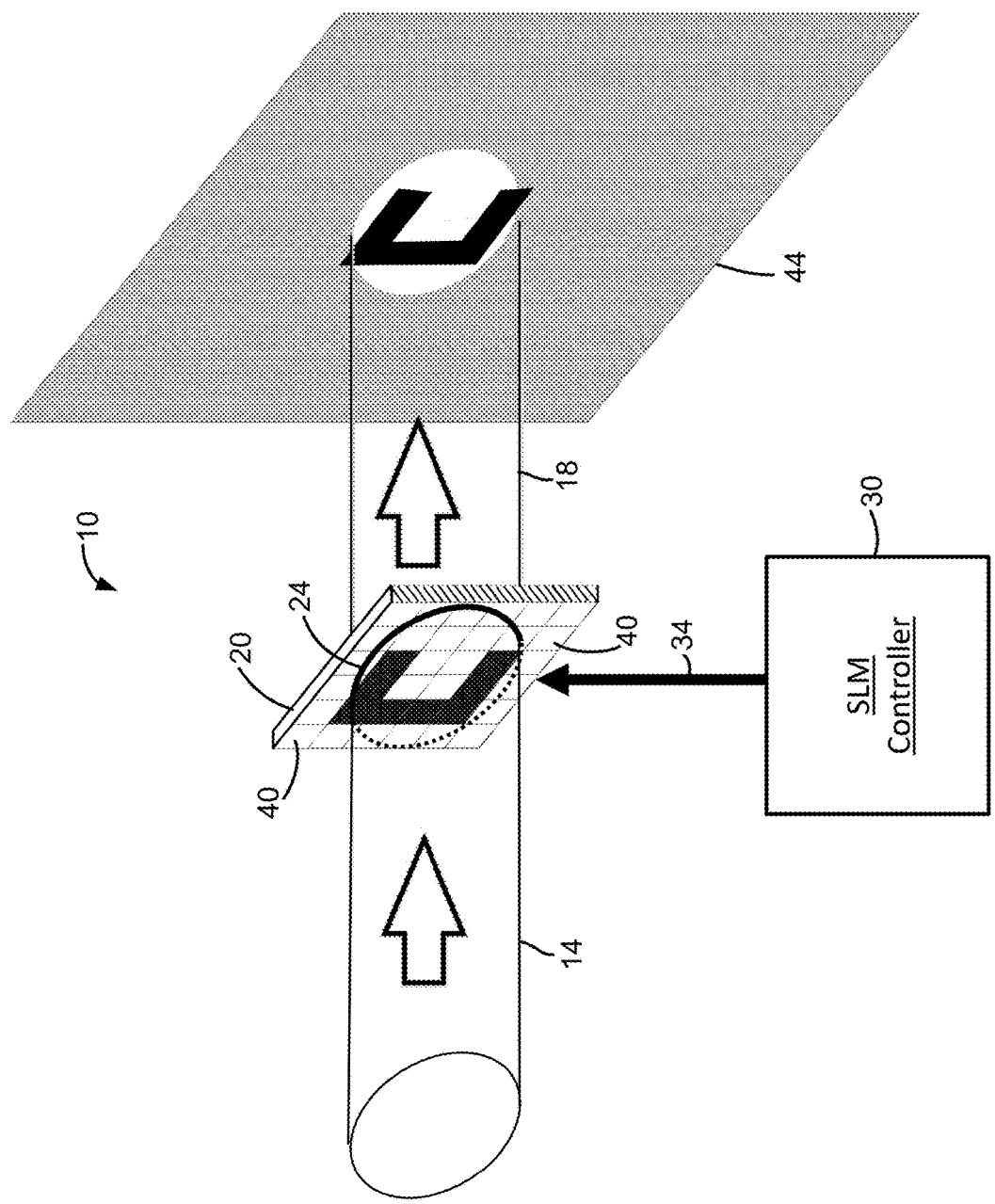
FIG. 1b is a diagrammatic view, in perspective depicting the spatial light modulator of FIG. 1a being used to modulate a beam of light such that a letter 'C' is displayed on a screen.

Applicants recognize that in the prior art, such as illustrated in FIG. 1 of Cox, each pixel defines an input aperture that is essentially the same size as the modulator aperture for that pixel at least for the reason that there is no concentration element or overall concentration layer disclosed. In other words, the input aperture size and the modulator aperture size are one and the same and are in a fixed relationship that cannot be varied or customized. While there are gaps formed between adjacent pixels, any increase in the area required for control signals reduces the lateral extents of the pixel, resulting in an additional loss of the input light beam energy.

In the prior art, such as Cox and U.S. Pat. No. 4,563,236 issued to Ross, et al., the pixel must serve a dual purpose of collecting the light from the scene to be imaged and modulating the light. This can require compromises so that neither collecting nor modulating is optimized. In the present disclosure, these requirements have been decoupled so that each function can be optimized independently. Stated in another way, the relationship between the concentrator input area and an associated modulator input area can be changed, as needed. For example, these embodiments even provide the flexibility to increase the concentrator input area while, at the same time, decreasing the associated modulator input area. The concentration layer can be the appropriate size and shape so that the light from the scene is efficiently coupled into the advanced pixel modulators. Each individual concentrator 122, which can be a lens, as in the present example, or some other suitable structure can be shaped so that at least a majority of the light falling onto the concentration layer is captured.

The modulation layer in the present invention can thusly be optimized for its function without having to consider light collecting. For example, the behavior of a magnetic material is strongly affected by its shape. A Faraday element formed from a Faraday material in a thinner, taller shape is more likely to remain in a single domain than a Faraday element formed in a wider, shorter shape. Where switching speed is affected by size, the Faraday element can be made smaller to switch faster given that the present disclosure sweeps aside prior art compromises with respect to balancing the need for efficient light gathering against the need for acceptable modulation performance. Moreover, the modulator can be chosen based on cost constraints, as well, where less material can be less costly or where a particular size is available off the shelf in contrast to a custom size.

A further benefit resides in the design creating an interstitial gap between the APMs where other useful structures can be placed, such as cylindrical coils with many turns, or other magnetic structures, or electronic devices. In the prior art, such as Cox, adding such structures between the pixel modulators can adversely affect the light collecting function at least for the reason that adding these structures can require the pixel modulators of an array to be further spaced apart from one another such that additional input light is lost.

Figure 3D:
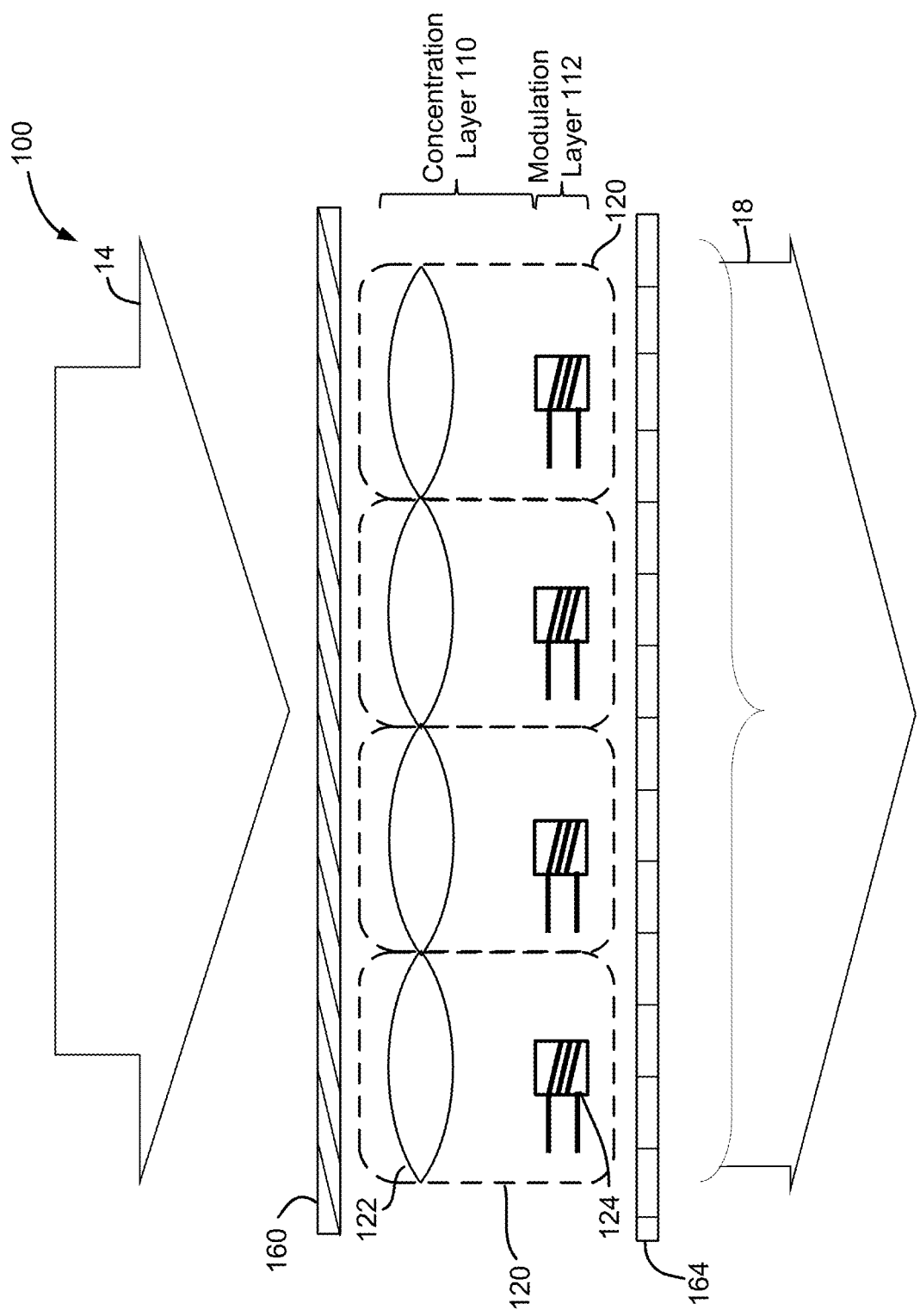
FIG. 3d is still another diagrammatic view, in elevation, of the spatial light modulator system of FIGS. 3a-3c illustrating further details relating to the placement of an input polarizer and output polarizer when needed.

Attention is now directed to FIG. 3d which is a diagrammatic view, in elevation, of spatial light monitor system 100, shown here to illustrate additional details. In some embodiments, magneto-optic modulators 124 require an input polarizer 160 to polarize input light beam 14 before reaching the modulators. In the figure, input polarizer 160 is placed some distance in front of the SLM system with respect to the propagation of the input light beam. In some embodiments, the input polarizer can be placed between the concentration layer and the modulation layer. In some embodiments yet to be described, the concentration layer and the modulation layer become tightly coupled. In this instance, one approach is to attach the input polarizer to the concentration layer. In yet another embodiment, which utilizes a refractive lens concentration layer, the refractive material can be split into two layers, with the input polarizer placed between the two layers. In still another embodiment, the input polarizer can be a coating applied on the surface of the individual concentrators that make up the input polarizer. The coating, for example, can be applied to the concentrator surfaces that confront incoming input light beam 14.

Still referring to FIG. 3d, an output polarizer 164 can be provided, although it is likewise not always required. For example, if a detector that receives the outgoing light beam is capable of discriminating polarization, the intensity of the output light beam or portions of the output light beam can be measured directly. Pixel Modulators (PMs) 120 can then be thought of as gates to add to or subtract from the amount of rotation of the polarization.

Figure 4:
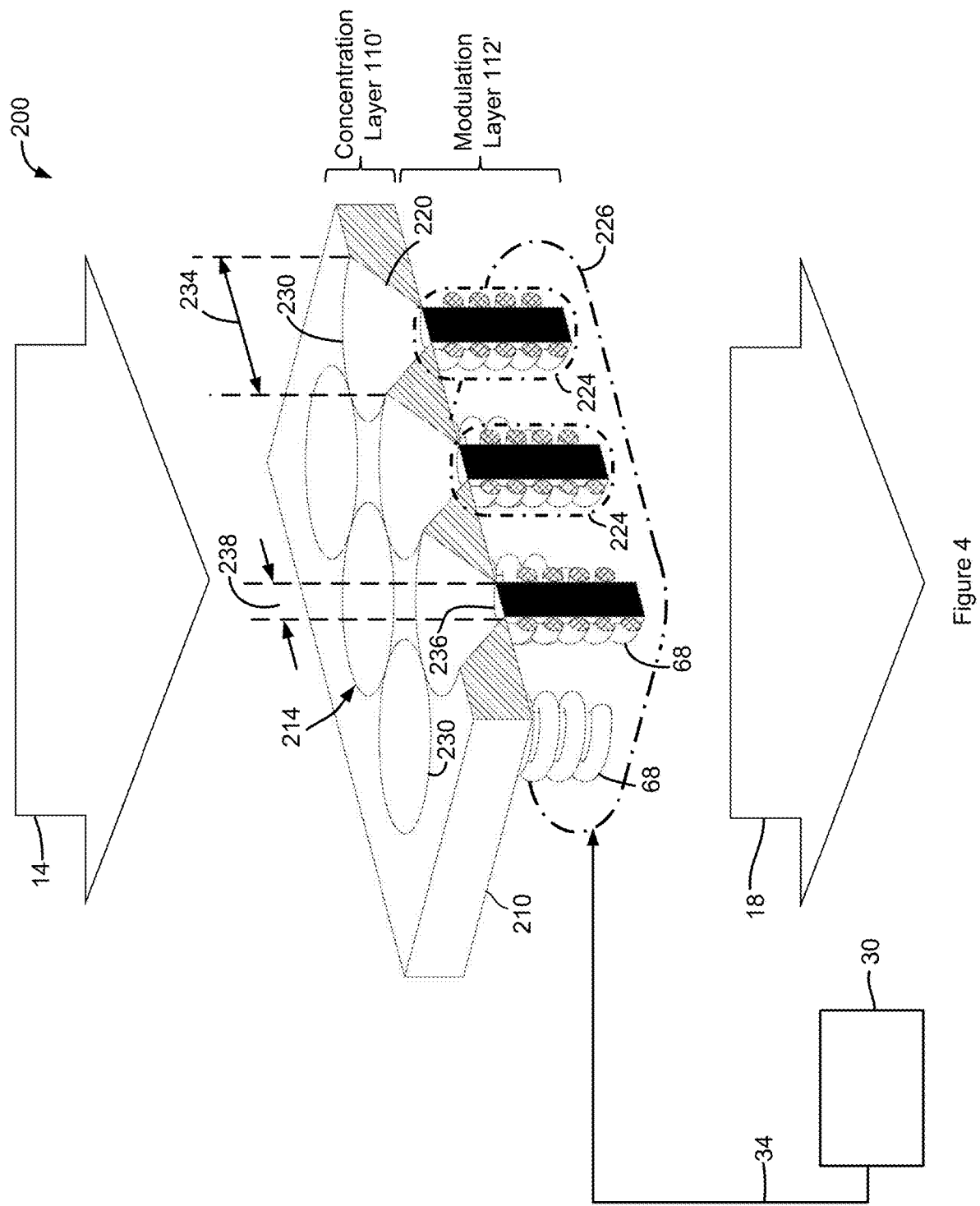
FIG. 4 is a diagrammatic view, in perspective, that illustrates another embodiment of a spatial light modulator system implemented in accordance with the present disclosure.

FIG. 4 is a diagrammatic view, in perspective, that illustrates an embodiment of an advanced spatial light modulator system implemented in accordance with the present disclosure and generally indicated by the reference number 200. Like previously described spatial light modulator system 100, spatial light modulator system 200 includes a concentration layer 110' and a modulation layer 112' wherein the latter receives control signals 34 from controller 30. Input light beam 14 enters the SLM system, is modulated by the SLM system, and leaves as modulated output light beam 18.

Concentration layer 110' of this embodiment includes a horn substrate 210 that can be horn array 214. In an embodiment, the horn array can be made up of a plurality of horns, several of which are individually designated by the reference number 220. In the present embodiment, the cavity of each horn is air-filled although, as will be seen, this is not a requirement. The horns act as concentrators. The figure depicts six horns in the array, three of the horns have been partially cut away for illustrative purposes. Accordingly, modulation layer 112' includes a corresponding array of six magneto-optic modulators several of which are designated by the reference number 224 (shown within a dot-dash rectangle) and which function in a manner that is consistent with the descriptions above. Three of modulators 224 are shown as partially cut-away in association with horns that are also shown as partially cut-away. As is the case with other arrays disclosed herein, array 214 can be of any suitable size in terms of rows and columns. Each horn intercepts some of the electro-magnetic waves (EMW) of input light beam 14 and directs the intercepted EMW into an associated modulator 224. As is the case with embodiments described above, one horn 220 operates in conjunction with an associated one of modulators 224 to form an advanced pixel modulator. Each PM modulates the EMW as it passes through the PM. Output light beam 18 is a combination of the EMW exiting each of the PMs of the array of PMs.

Horns 220 are depicted as frustoconical in overall shape and circular in lateral cross-section, however, this is not a requirement. Any suitable shape can be used for the horns including, but not limited to rectangular, corrugated, hexagonal, and so on. Array of horns 214 is depicted as a rectangular array organized as rows and columns. Applicants note that array 214 can be made up of any suitable geometric arrangement of horns covering the surface of the substrate. For example, in another embodiment, the horns on odd rows can be shifted relative to the horns on even rows such that the horns on a given row are located between the horns on the adjacent rows. With some horn shapes, such as the circular entrance aperture shown in the figure, shifting the horns of every other row allows the rows to be placed closer together and a larger fraction of the EMW of the input light beam to be collected. In another example embodiment, the horns can include a hexagonal entrance aperture such that the horns can be arranged in a hexagon tiling pattern such that the horns line up in rows oriented 120 degrees relative to one another. In another embodiment, the horns can be square or rectangular and arranged in a square or rectangular tiling pattern.

With continuing reference to FIG. 4, the dimensions of horns 220 can be chosen to match the frequency or frequencies of the incoming EMW. Horn substrate 210 can be a metal or any suitable conductive material with the horns formed into the substrate by any suitable method such as, for example, machined, molded, stamped, diffusion bonded and so on. Horn substrate 210 can be formed of a non-conductive material such as, for example, plastic that is coated with a conductive material. Using non-conductive material for the horn substrate allows for additional material choices and manufacturing techniques, such as injection molded plastic, that may offer other advantages including lower cost, ease of assembly and/or combining of the concentration layer with some or all of the modulation layer. The coating for a non-conductive horn substrate can, by way of non-limiting example, be evaporated or sputtered aluminum, plated nickel or copper, silver epoxy and so on.

Modulation layer 112' as depicted in the figure includes an array of magneto-optic modulators 226. A structure holding each modulator in the correct position within the array is not depicted in the figure for illustrative purposes, but is understood to be present. Such a structure can be a separately manufactured part that connects or snaps into the horn substrate material of the concentration layer. This structure can be formed, for example, by injection molding. The concentration layer and modulation layer are not required to be separate physical structures. Horn substrate 210 of the concentration layer can contain features that hold the array of modulators. In this way, the concentration layer and modulation layer, and thus the SLM system, can be embodied in the same physical part.

As seen in FIG. 4, the EMW enters an input aperture 230 of each horn 220 having a concentrator input aperture size that is characterized as a diameter 234 and is concentrated by the shape of the horn to then exit the horn and the concentration layer into a modulator input aperture 236 of the corresponding modulator in the modulation layer. The modulator aperture, in the present embodiment, includes a modulator input aperture size that is characterized by a diameter 238. The amount of concentration that occurs is determined in part by the relationship of concentrator input aperture size to the modulator input aperture size as well as other effects such as, for example, size and shape dependent coupling effects. Any of the EMW of input light beam 14 that does not enter a concentrator input aperture will not be subject to modulation. Accordingly, the concentrator array can be configured in the manners described above when it is desired to reduce or minimize loss.

After passing through the concentration layer, the concentrated EMW is modulated in the modulation layer which uses magneto-optic modulators. The concentrated EMW enters each modulator aperture 226 which is the front surface of a Faraday element. The Faraday element is comprised of a material relatively transparent to the EMF and so it continues through the Faraday element. The material comprising the Faraday element exhibits the Faraday effect in which the polarization of the EMW passing therethrough can be rotated. The strength and direction of the magnetic field passing through the Faraday element determines the direction and the amount of the rotation. When the Faraday material is magnetized in one direction, the polarization of the EMW flowing through Faraday material is rotated one direction. When the Faraday material is magnetized in the other direction, the polarization of the EMW is rotated in the other, opposite direction. The stronger the magnetic field within the Faraday material, which is related to the applied magnetic field from the coils and the magnetic properties of the material, the greater the amount of rotation. Electrical current passing through coil 68 of each modulator determines the magnetic field. In the embodiment depicted in this and other figures, the coil is depicted as wrapped multiple times around the Faraday element. A practitioner of ordinary skill in the art will appreciate that depending on the strength of the current, the specifics of the Faraday element such as the characteristics of the Faraday material, its shape and dimensions and the presence and characteristics of other magnetic materials, the number of turns in the coil can vary and can be as few as a 'partial turn' with a conductor passing in close proximity to the Faraday element.

The Faraday material used in the Faraday elements in the pixel modulators in the array of modulators can be of any suitable shape, such as cylindrical (as depicted in FIG. 4), rectangular or hexagonal in cross-section or any suitable shape. The shape of the Faraday material may be different than that of its feed horn. The size (i.e., diameter) of the Faraday material may also be different than the size (i.e., diameter) of the exit aperture of the horn feeding the modulator. For example, the diameter of the Faraday material can be larger than the diameter of the exit aperture of the associated concentrator to reduce edge effects.

The Faraday material used in the Faraday elements can be formed of 'soft' magnetic material, i.e. magnetic material with a low coercivity Hc. In such an arrangement, the magnetization of the Faraday material can be set by current that is constantly passing through the coils. This allows the magnetization patterns of the array to be set very quickly by directly setting the magnetizations of the Faraday elements. The Faraday material can also be formed instead of 'hard' magnetic material, i.e. magnetic material with a high remanence (Mr) and high coercivity (Hc). Using 'hard' magnetic materials allows the material to 'remember' or retain its magnetization and the currents in the coils to remain mostly off or at least at lower levels. The current need only be pulsed when the magnetization requires changing.

The Faraday material used in the Faraday elements can also be formed as composite structures of 'hard' and 'soft' magnetic materials. This can allow optimization of dealing with demagnetization fields, holding currents, and magnetic interaction from adjacent modulators. For example, the Faraday material can be comprised of different layers, such as a 'soft' layer and a 'hard' layer or a 'soft' layer sandwiched between two 'hard' layers.

Figure 5:
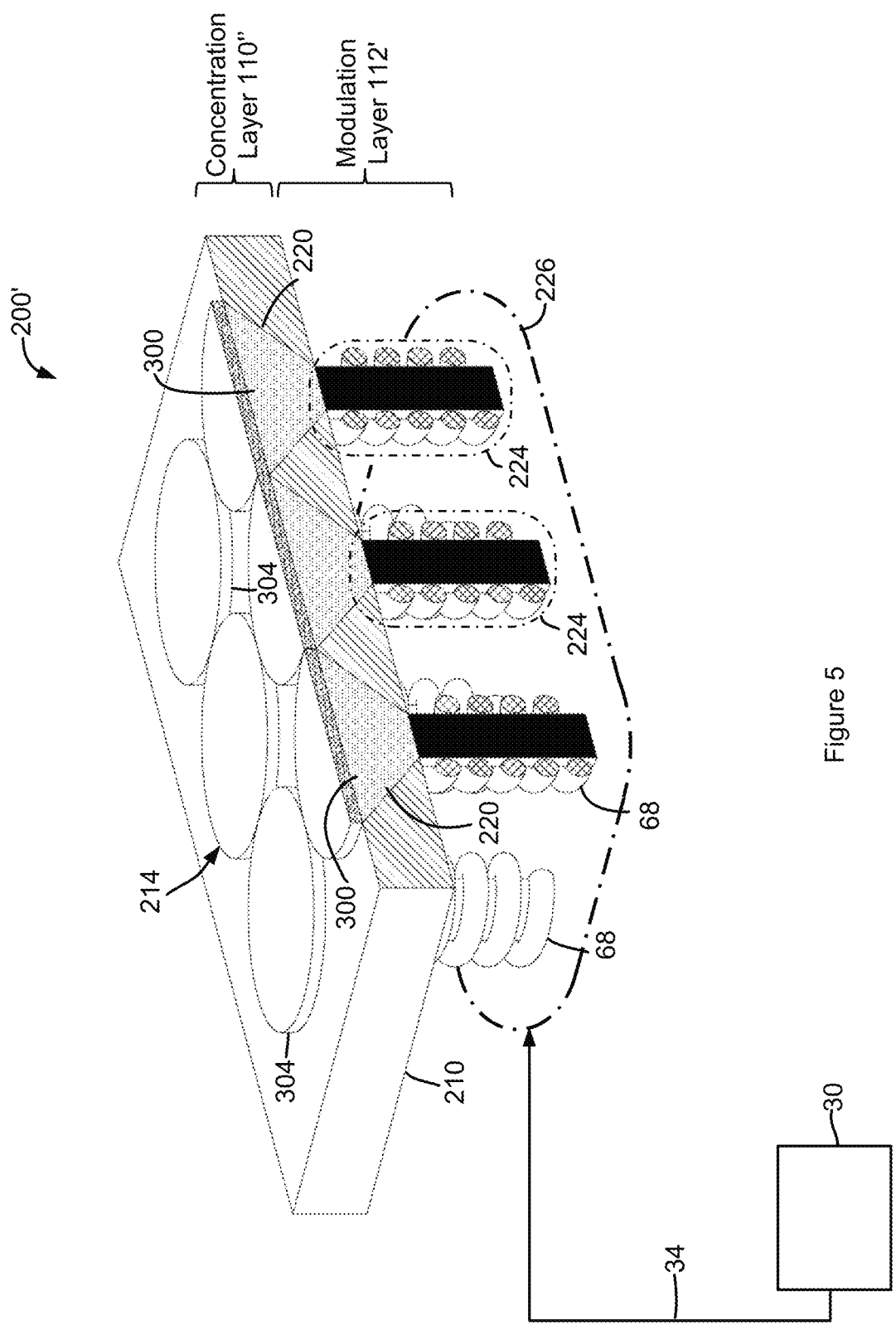
FIG. 5 is a perspective view that illustrates another embodiment of a spatial light modulator system implemented in accordance with the present disclosure.

FIG. 5 is a diagrammatic view, in perspective, that illustrates another embodiment of an advanced spatial light modulator system implemented in accordance with the present disclosure and generally indicated by the reference number 200'. To the extent that embodiment 200' is essentially identical to embodiment 200 of FIG. 4, descriptions of like components may not be repeated. Embodiment 200' is different, however, in that the interior cavity defined by each one of horns 220 is filled with a dielectric 300. The dielectric is a material that is relatively transparent to the electromagnetic waves (EMW) in the frequencies of interest of input light beam 14 (FIG. 4) and that has a refractive index at those frequencies which is significantly higher than that of air. The higher refractive index of dielectric 300 can allow the horns to be more efficient at gathering the incoming EMW (increasing the gain) and can even permit altering of the geometry of the horn.

With regard to dielectric 300, it is noted that such an abrupt change in index of refraction as the EMW enters the dielectric can cause some amount of the EMW to be reflected back away from and fail to enter spatial light modulator system 200', thus reducing its efficiency. Although not a requirement, one or more layers of an anti-reflective coating 304 can be placed on the surface of dielectric 300 to reduce the reflection and improve efficiency. In another embodiment, a layer of polarizer material can be placed directly atop dielectric 300 or anti-reflective coating 304.

Figure 6:
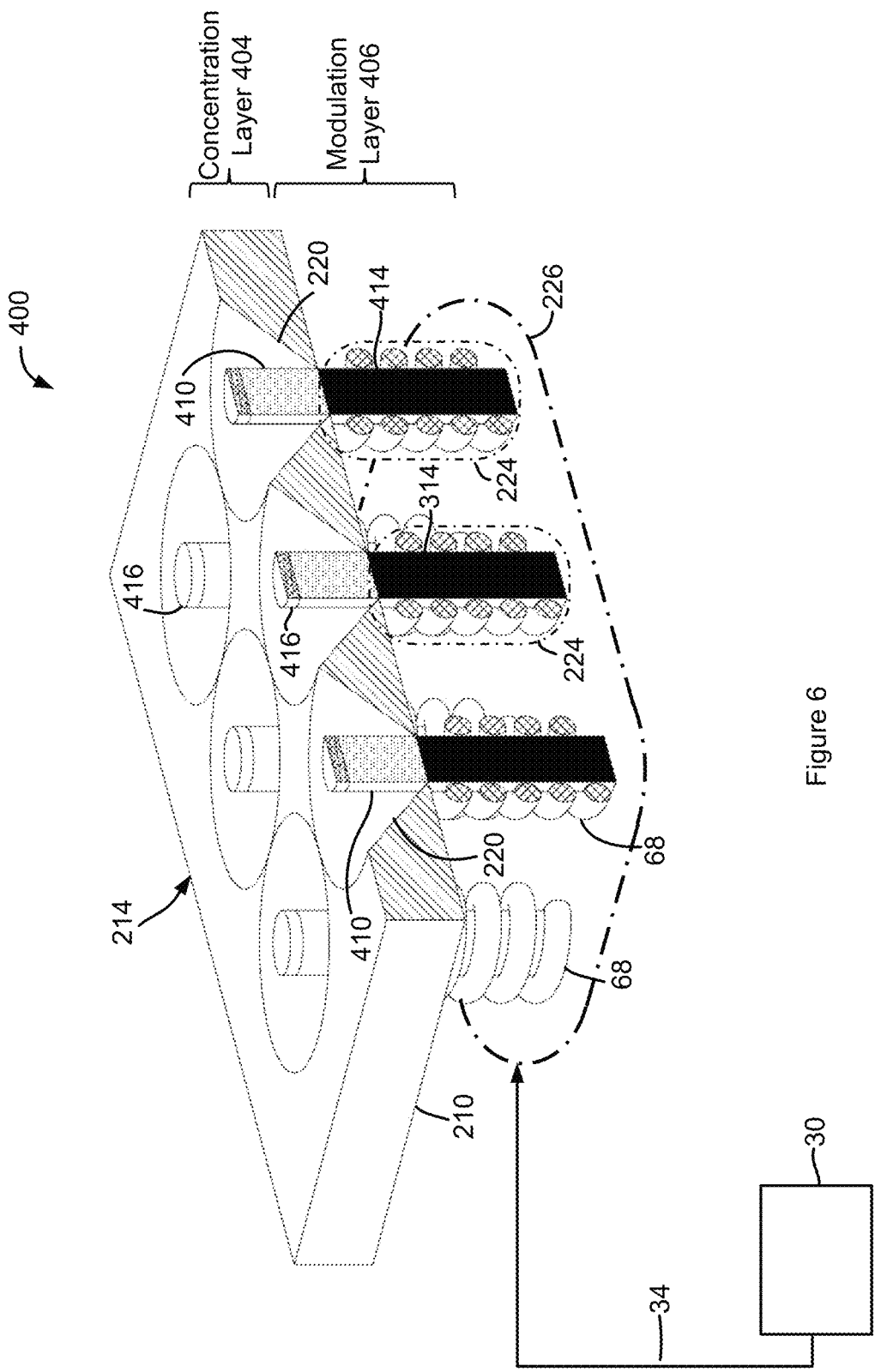
FIG. 6 is a diagrammatic perspective view that illustrates yet another embodiment of a spatial light modulator system implemented in accordance with the present disclosure.

FIG. 6 is a diagrammatic view, in perspective, that illustrates another embodiment of an advanced spatial light modulator system implemented in accordance with the present disclosure and generally indicated by the reference number 400. The present embodiment includes a concentration layer 404 and a modulation layer 406. To the extent that embodiment 400 is essentially identical to embodiments 200 of FIG. 4 and 200' of FIG. 5, descriptions of like components may not be repeated. Embodiment 400 is different, however, in that horns 220 are only partially filled with a dielectric as part of concentration layer 404. In particular, a dielectric post or cylinder 410 or other suitable shape is supported on an outwardly facing end (confronting the exit aperture of an associated concentrator 220) of a Faraday element 414 in a respective one of modulators 224. It is noted that a cylindrical shape is not required and any suitable shape can be used. The dielectric form of a cylinder or post can provide waveguide-like action directing EMW from the input light beam into the associated magneto-optic modulator 224. As in FIG. 5, the outward surface or free end of dielectric post 410 can be coated with an anti-reflective coating 416 to reduce the reflections from the abrupt transition in index of refraction from the air to the dielectric. Likewise, a polarizer layer can be provided.

Figure 7:
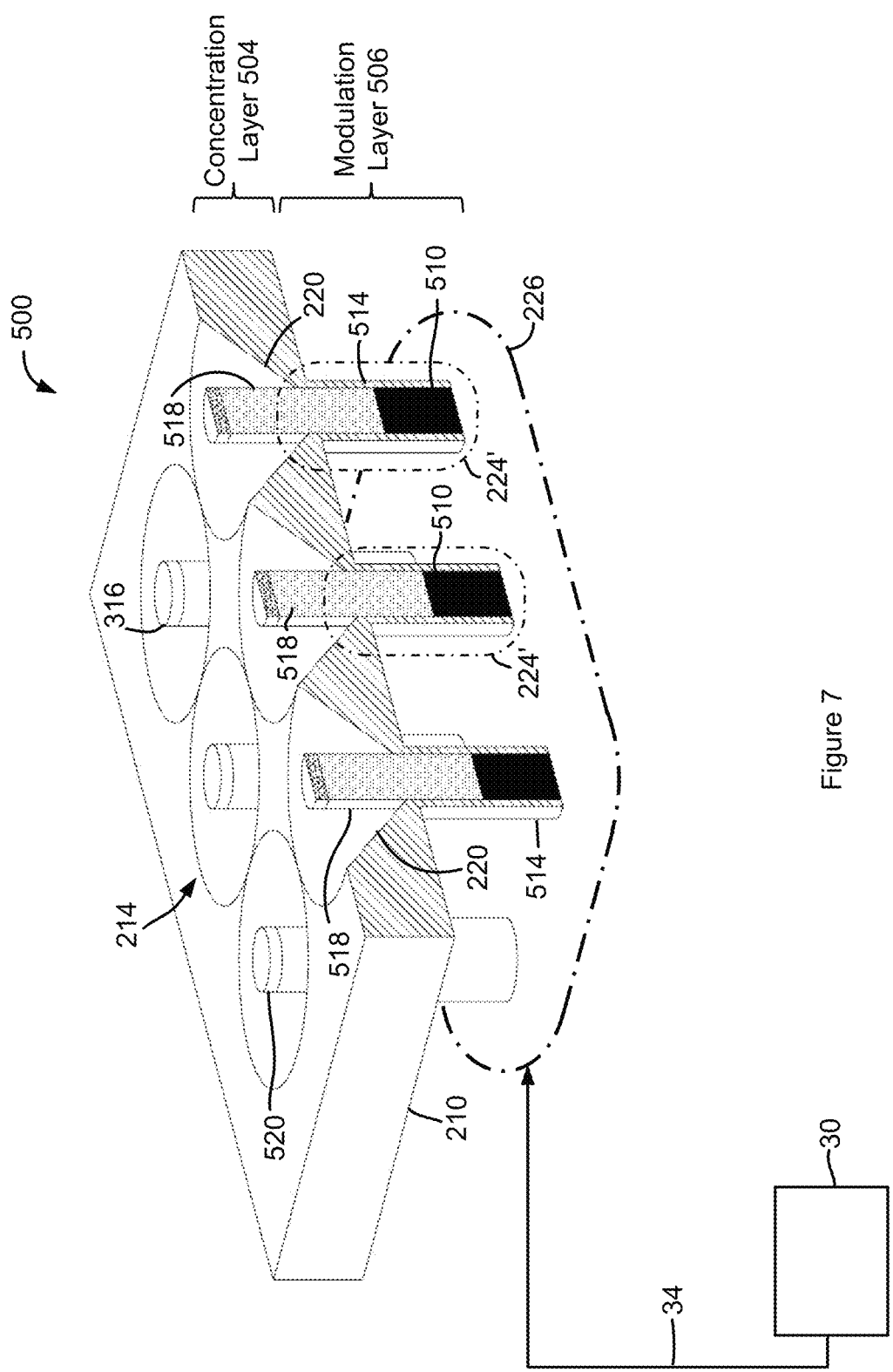
FIG. 7 is a diagrammatic view, in perspective, that illustrates still another embodiment of a spatial light modulator system implemented in accordance with the present disclosure.

FIG. 7 is a diagrammatic view, in perspective, that illustrates another embodiment of an advanced spatial light modulator system implemented in accordance with the present disclosure and generally indicated by the reference number 500. The present embodiment includes a concentration layer 504 and a modulation layer 506. To the extent that embodiment 500 is essentially identical to embodiments 200 of FIG. 4, 200' of FIG. 5 and 400 of FIG. 6, descriptions of like components may not be repeated. Embodiment 500 is different, however, in that a modulator 224' includes a Faraday element 510 that is received within a waveguide 514 such that one end of the Faraday element confronts a respective exit aperture of one of horns 220, but is spaced apart therefrom. This end of Faraday element 510 supports a dielectric post 518 that is partially received within waveguide 514 and extends through the exit aperture of the respective horn 220 such that dielectric post 518 partially fills the cavity of the respective horn. As illustrated, waveguide 514 is a cylinder of conductive material which further improves directing of the electro-magnetic waves concentrated by horn 220 to the respective modulator. As shown, magneto-optic modulator 224' is housed within waveguide 514. This can further improve efficiency by confining the EMW to the effective portion of the modulator. As above, the outward surface or free end of dielectric post 518 can be coated with an anti-reflective coating 520 to reduce the reflections from the abrupt transition in index of refraction from the air to the dielectric. Likewise, a polarizer layer can be provided. As is the case with any dielectric post or tube described herein, any suitable shape can be used and the illustration of a cylindrical shape should not be construed as limiting.

Waveguides 514 can be fabricated separately or manufactured as an integral part of horn substrate 210. It should be noted that a waveguide is not restricted to a concentration layer including an array of horns, but can be used with broad applicability including in concentration layers such as those which utilize refractive lenses. Insofar as construction, waveguide 514 can be formed from plastic and then coated with conductive material. This can be advantageous when the horn substrate is injection molded plastic, as the waveguide can be included in the mold and then coated with a conductive material similar to, and possibly concurrent with, the coating of the horns with a conductive material. As is the case with any waveguide illustrated herein, any suitable shape can be used and the illustration of a cylindrical tubular shape should not be construed as limiting.

It should be noted that coils 68 have not been shown in FIG. 7 for purposes of illustrative clarity, but such coils are understood to be present. The coils can be wrapped around waveguide 514, as shown in previous figures. It is noted that a portion of the changing magnetic field that passes through the conductive wall of the waveguide responsive to a coil can induce back electromotive force (back-EMF) which can, depending on design specifics, induce a current creating a magnetic field opposing the magnetic field created by the current in the coils. This opposing magnetic field will decay over time, depending on the amount of induced Back-EMF and other design specific factors. Some relevant design specifics that can influence the Back-EMF include the resistivity of a conductor and geometry, such as the thickness of the waveguide wall. Depending on the response time required for changes to the magnetic field controlling the Faraday elements, these design specifics can be chosen to reduce the amount of induced current and thus improve the response time, as discussed in further detail immediately hereinafter.

Figure 8:
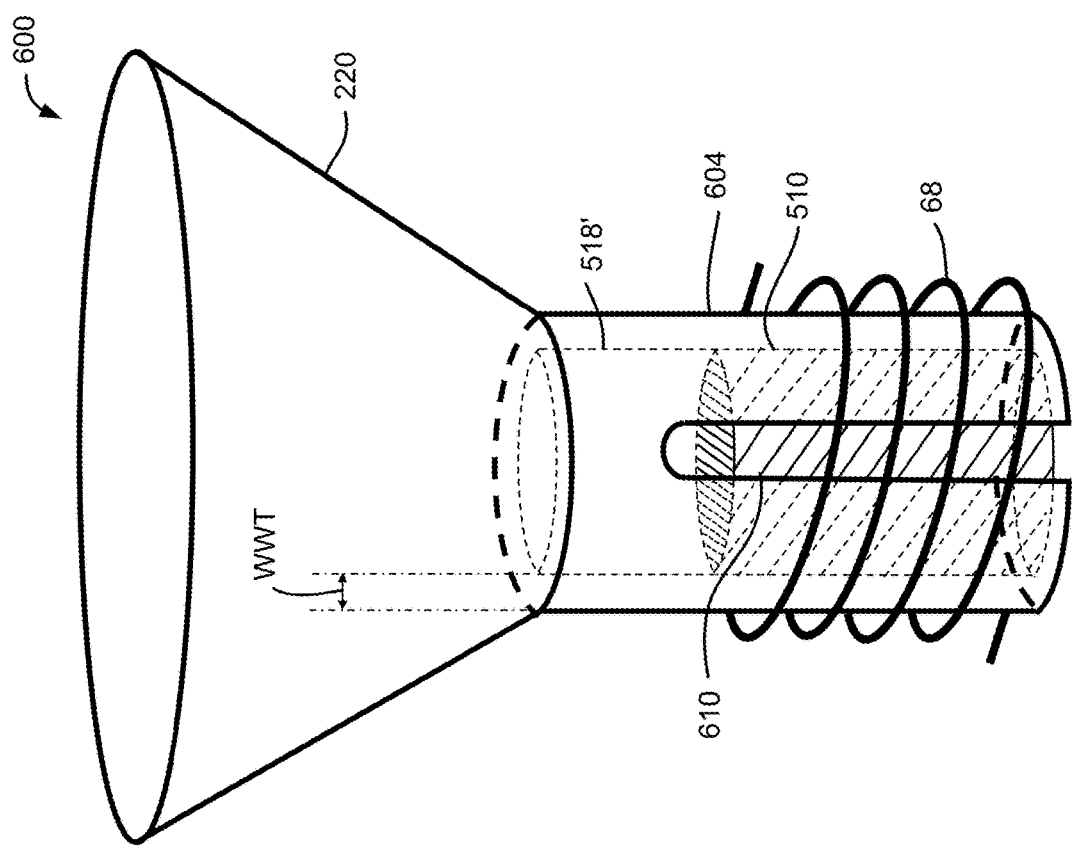
FIG. 8 is a diagrammatic view, in perspective, shown here to illustrate additional features of a pixel modulator which can form part of the embodiment of the system shown in FIG. 7.

FIG. 8 is a diagrammatic view, in perspective, of a Pixel Modulator (PM), generally indicated by the reference number 600, that includes an embodiment of a waveguide 604 that can be used, for example as waveguide 514 of FIG. 7. Back-EMF driven induced currents into the waveguide were discussed above with regard to FIG. 7. Faraday element 510 and a dielectric post 518' are also shown. Post 518', in this embodiment, can be of any suitable length and is not required to extend into the cavity of horn 220. Because of the orientation of coil 68, the magnetic fields induced by current in the coil are essentially oriented vertically (up and down the waveguide). The back-EMF induced currents run circumferentially around the waveguide through the waveguide wall having a thickness WWT. Applicant recognizes that there are several design choices that can be made to reduce these currents and their negative effects.

First, a relatively thinner WWT presents a relatively higher resistance to the back-EMF currents. The WWT needs to transmit the EMF along the waveguide. This depends on the frequency/wavelength of the EMW in waveguide 604 and not on the switching speed of the modulator, which is much slower. WWT needs only to be thick enough to contain the higher frequency EMW within the waveguide. Second, the choice of conductor material from which the waveguide is formed can affect the resistivity and thus the circumferential resistance around the waveguide wall. The resistivity can also be raised by dopants. This is a trade-off, as increasing the resistivity would decrease the performance of the waveguide for transmitting the EMF wave. Third, a slot 610 as shown can be placed in the waveguide wall. This interrupts the circumferential currents that induce the opposing magnetic fields. Slot 610 also interrupts the waveguide properties so it is desirable to make the slot as narrow as practical. In an embodiment, one or more depth slots can be used, in which the conductor of the waveguide wall is not completely interrupted but only becomes thinner within the slot area. While only one slot is shown, other embodiments can use multiple slots that are angularly distributed about the periphery of the waveguide wall.

Figure 9:
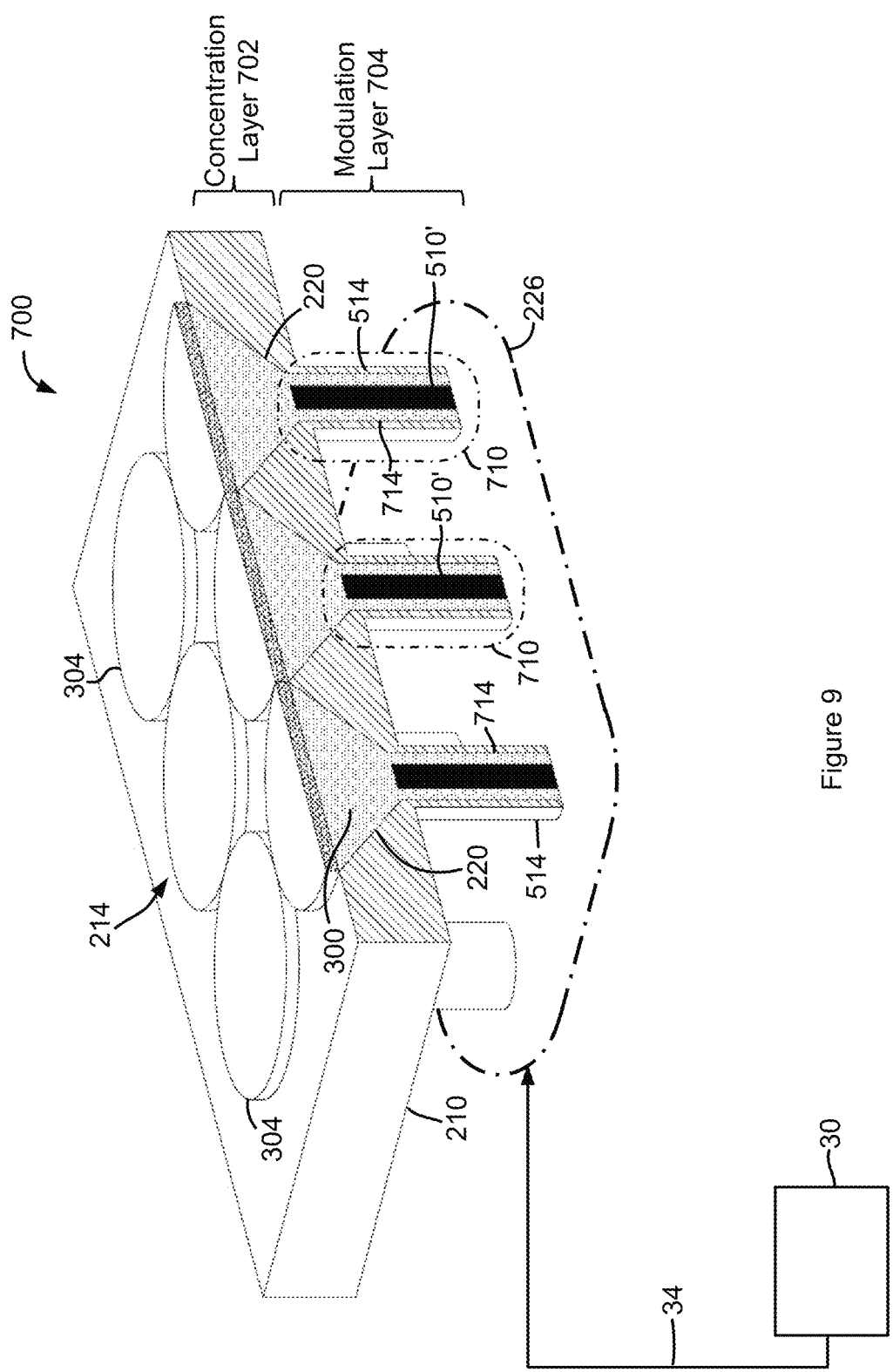
FIG. 9 is a diagrammatic view, in perspective, that illustrates another embodiment of a spatial light modulator system implemented in accordance with the present disclosure.

FIG. 9 is a diagrammatic view, in perspective, that illustrates another embodiment of an advanced spatial light modulator system implemented in accordance with the present disclosure and generally indicated by the reference number 700 including a concentration layer 702 and a modulation layer 704. To the extent that this embodiment is identical to embodiment 500 of FIG. 7, descriptions of like components will not be repeated for purposes of brevity. Embodiment 700 is different, however, in that dielectric 300 fills horns 220. Also, modulators 710 include a Faraday element 510' that does not completely fill the lateral extents of waveguide 514. Instead, the Faraday material is contained within and surrounded by a dielectric layer 714 that is sandwiched between waveguide 514 and Faraday element 510'. Dielectric layer 714 may be referred to as a dielectric pipe or tube. In an embodiment, this configuration can improve efficiency in terms of the amount of EMW that is received by the Faraday element. It is noted that layer 714 can be used in other embodiments such as, for example, the embodiments of FIGS. 4-6 wherein the dielectric pipe can serve as a waveguide to direct the EMW. It is noted that Faraday element 514' and dielectric layer 714 can include any suitable shape in lateral as well as lengthwise extents.

Figure 10:
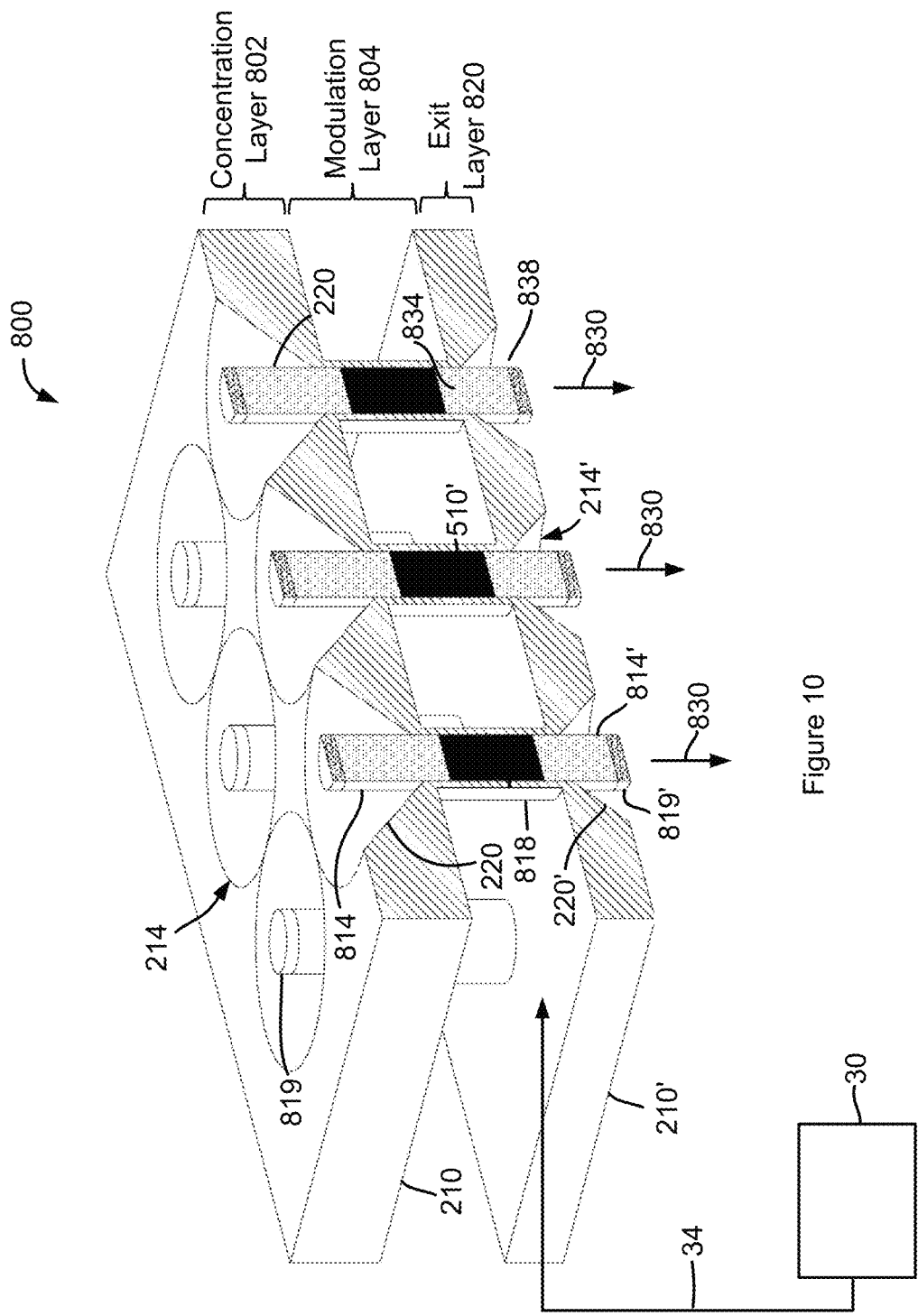
FIG. 10 is a diagrammatic view, in perspective, that illustrates another embodiment of a spatial light modulator system implemented in accordance with the present disclosure.

FIG. 10 is a perspective view that illustrates another embodiment of an advanced spatial light modulator system implemented in accordance with the present disclosure and generally indicated by the reference number 800. A concentration layer 802 is included along with a modulation layer 804. Like the embodiments of FIGS. 6 and 7, a post 814 of dielectric is used and, like FIG. 7, a waveguide 818 is in use. Each post can receive an anti-reflection layer 819. In this embodiment, however, an exit layer 820, follows modulation layer 804. Exit layer 820 includes another array of horns 214' formed in a horn substrate 210'. In an embodiment, the exit layer can be a mirror image of concentration layer 802, although this is not a requirement. In the present embodiment, the exit layer includes horn substrate 210' defining array of horns 214'. Each advanced pixel modulator includes an additional dielectric post 814' adjacent to an opposite end of each Faraday element 510'. Each additional dielectric post 814' can include a free end that supports dielectric layer 819. Exit layer 820 is provided for purposes of matching to the impedance of the air or ambient environment (i.e., below the exit layer in the view of the figure), for portions 830 (indicated by arrows) of the output light beam. Accordingly, each horn in array of horns 214', along with any associated components of the exit layer, serves to impedance match the waveguide to the surrounding environment as well as to remap the modulation layer output having a modulation layer output spatial distribution to a modified spatial distribution. In this embodiment, the exit layer has an input area 834 and an exit layer output area 838 that is larger than the exit layer input area such that each horn expands a modulated output light beam received from an associated modulator in the array of modulators for impedance matching the expanded modulated output light beam to an ambient environment. It is noted that the dimensional configuration of exit layer 820 can be different than the dimensional configuration of concentration layer 802 at least for purposes of impedance matching. In other embodiments, the exit layer can include an array of concave lenses having a plurality of concave lenses with each concave lens serving and in optical alignment with one of the light modulators of the modulation layer. It is noted that any embodiment of a spatial light modulation system described herein can include an exit layer in light of the teachings that have been brought to light.

Figure 11A:
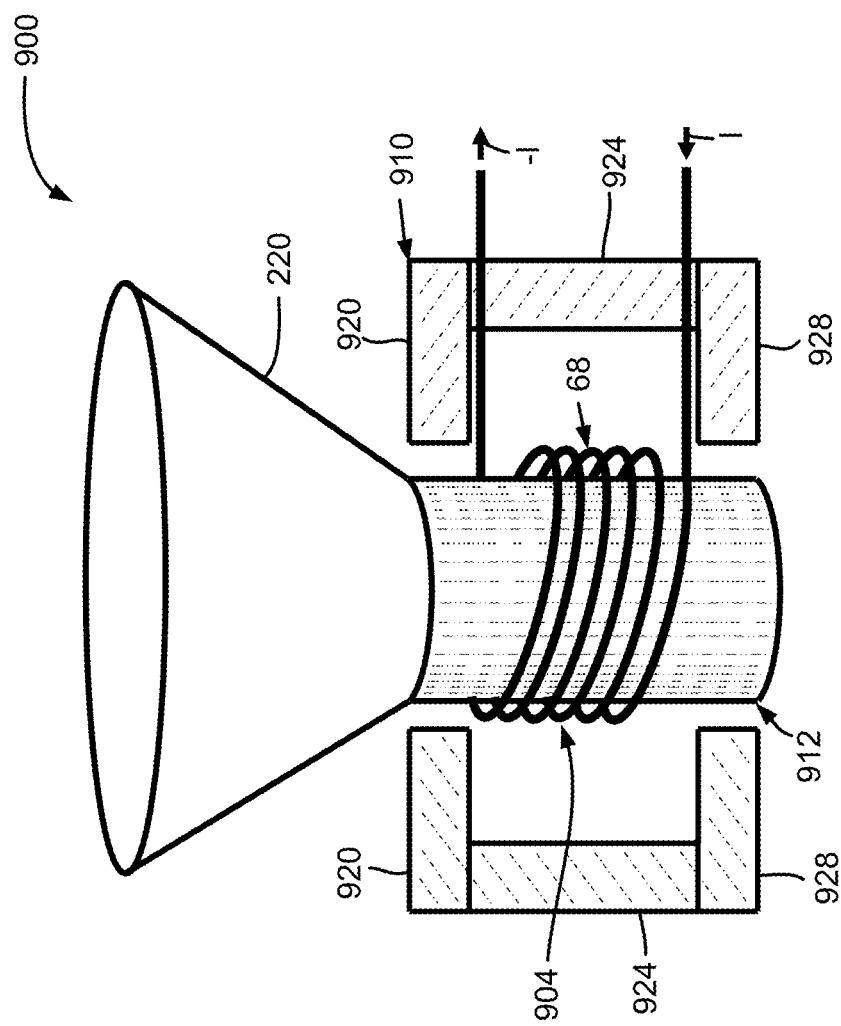
FIG. 11a is a diagrammatic view, in elevation and partial perspective, that illustrates an embodiment of a pixel modulator for which embodiments of a flux return system are implemented.

FIG. 11a is a diagrammatic view, in elevation and partial perspective, that illustrates an embodiment of an advanced pixel modulator produced in accordance with the present disclosure and generally indicated by the reference number 900. Pixel modulator 900 includes a magneto-optic modulator 904 which is augmented by a flux return path or system 910 that can be a high permeability or soft magnetic material. As discussed above, a magneto-optic modulator requires a magnetic field passing through a Faraday element 912 in order to modulate the polarization of the light passing therethrough. Without flux return path 910 present, the magnetic field must close through the air or other low permeability material, such as plastic or other structural material, and travel a path with higher reluctance. This induces a higher demagnetization field within the Faraday element internal to the advanced pixel modulator.

In an embodiment, flux return path 910 is a pathway or system of high permeability or soft magnetic material from one end of the Faraday element to the other, significantly reducing the demagnetization field in the Faraday element. This allows Faraday element 912 to remain magnetized and reduces the requirements on choice of a Faraday material and the Faraday element geometry. While not shown, it is noted that components such as, for example, a waveguide and dielectric pipe can be present such that flux passes through these components to and from the flux return path. The flux return path can reduce the effect of coupling fields from adjacent bits and can at least reduce the requirement for a holding magnetic field (and therefore current). Reducing the demagnetization field lowers the amount of switching magnetic field, making the response faster and requiring less current I and power to switch. In this embodiment, flux return path 910 can be implemented in sections: a top flux return member 920, a vertical or coupling flux return member 924, and a bottom flux return member 928. Each of the top and bottom flux return members can be implemented using a sheet material. In an array, coupling flux return member 924 can be formed between adjacent ones of the advanced pixel modulators extending between top and bottom layers of sheet material, as will be described at an appropriate point hereinafter. In another embodiment, flux return path 910 can be implemented separately for each advanced pixel modulator within an array. In this instance, coupling return member 924 can be cylindrical or some other suitable tubular shape, which can be elongated, surrounding modulator 904 while first, top flux return member 920 and second, bottom flux return member 928 are essentially lids partially closing the opposing end openings of coupling return member 924 with each of the top and bottom flux return members defining an aperture to receive modulator 904. An inner periphery of a respective one of the top and bottom flux return members is positioned adjacent to one end of the Faraday material. In still another embodiment, coupling return member 924 can be used without the top and bottom flux return members as an effective flux return path. In this latter embodiment, the upper end of coupling return member 924 can be adjacent or near the upper end of Faraday element 912 and the lower end of coupling return member 924 can be adjacent or near the lower end of the Faraday element. In still another embodiment, a selected one of the top and bottom flux return members can be used without the other one of the top and bottom flux return members.

Figure 11B:
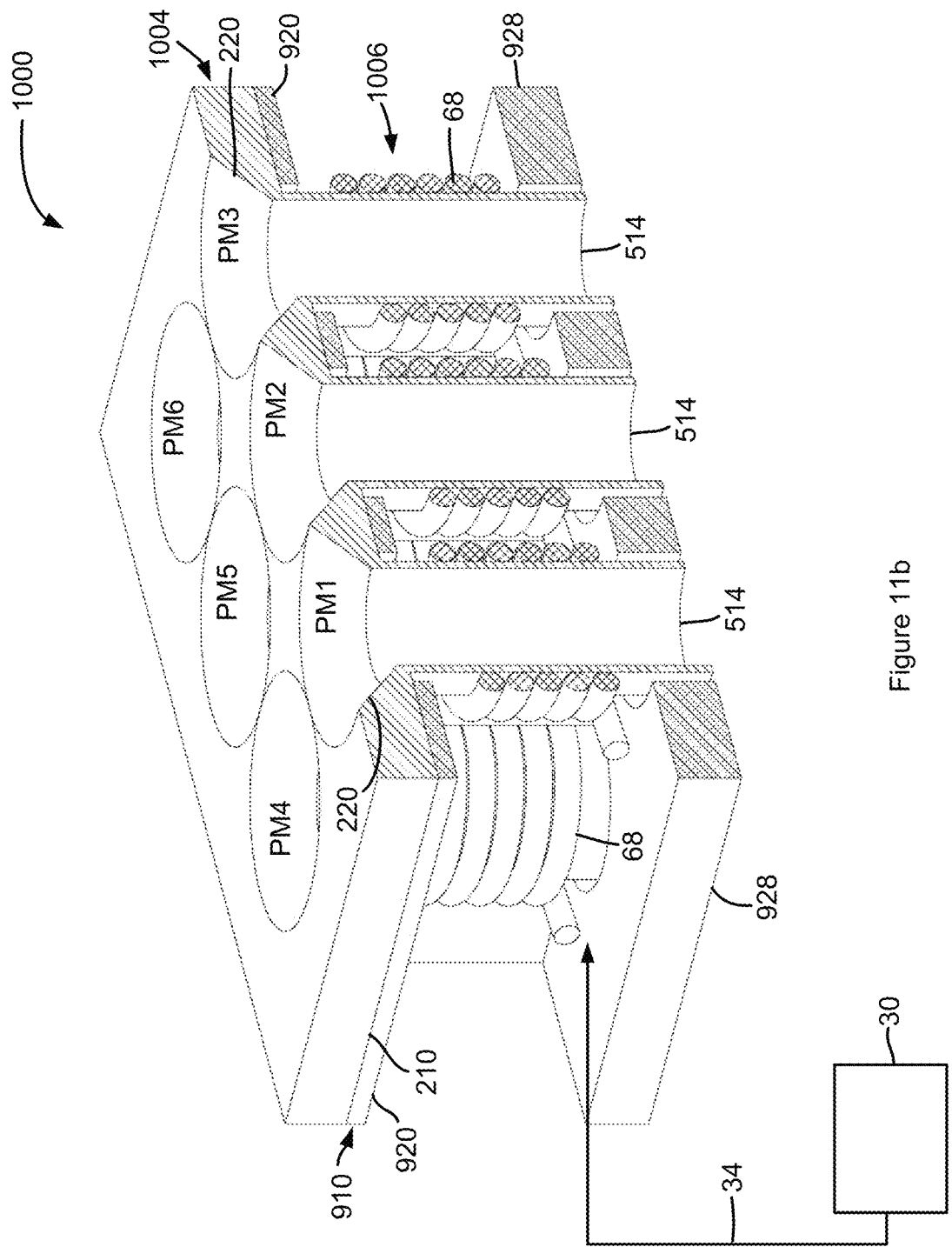
FIG. 11b is diagrammatic view, in perspective, that illustrates an embodiment of a spatial light modulator system implemented in accordance with the present disclosure including another embodiment of a flux return path.

Referring to FIG. 11*b*, a diagrammatic view, in perspective, is presented that illustrates an embodiment of a spatial light modulator system implemented in accordance with the present disclosure and generally indicated by the reference number 1000. System 1000 resembles embodiment 500 of FIG. 7 at least to the extent that 6 modulators are shown in 2 rows of 3 advanced pixel modulators using a concentration layer 1004 made up of horns 220 and a magneto-optic modulation layer 1006. It is noted that the cores of the advanced pixel modulators have not been shown for purposes of illustrative clarity. It should be appreciated that FIG. 11*b* can be illustrative of a part during the manufacturing process before the Faraday elements, manufactured separately, are inserted. Likewise, no dielectric posts are depicted. If desired, dielectric posts can also be inserted as part of the manufacturing process. Horn substrate 210 continues downward in the view of the figure to form waveguide 514. Coils 68 are depicted wrapped around the waveguides. Unlike embodiment 500 however, system 1000 includes flux return path 910, as initially described with regard to FIG. 11*a* and described in additional detail immediately hereinafter.

The advanced pixel modulators (APMs) have been designated as PM1-PM6 for descriptive purposes. PM1-PM3 have been shown as partially cut-away. Each PM includes an associated horn 220 and an associated coil 68. Top flux return member 920 of this embodiment is in the form of a sheet of high permeability magnetic material located below horn substrate 210. In one embodiment, the top flux return sheet can be a continuous sheet with apertures through which waveguides 514 pass. Bottom flux return member 928 can also be formed from a sheet of high permeability magnetic material located at the bottom of the structure in the view of the figure and can be a continuous sheet with apertures through which waveguides 514 pass. Faraday elements are understood to be present, although not shown, and are of a length and positioned such that the top and bottom of each Faraday element is near top flux return member 920 and bottom flux return member 928, respectively, in the manner shown in FIG. 11*a*, creating a short flux path between each end of the Faraday element and the flux return path. The spacing between the edge of each flux return sheet and the ends of the Faraday elements is not magnetically conductive and adds to the demagnetization field in the Faraday elements. It is noted that coupling flux return member 924 is not visible in FIG. 11*b* due to illustrative constraints and will, therefore, be shown in a figure to be described immediately hereinafter.

Figure 11C:
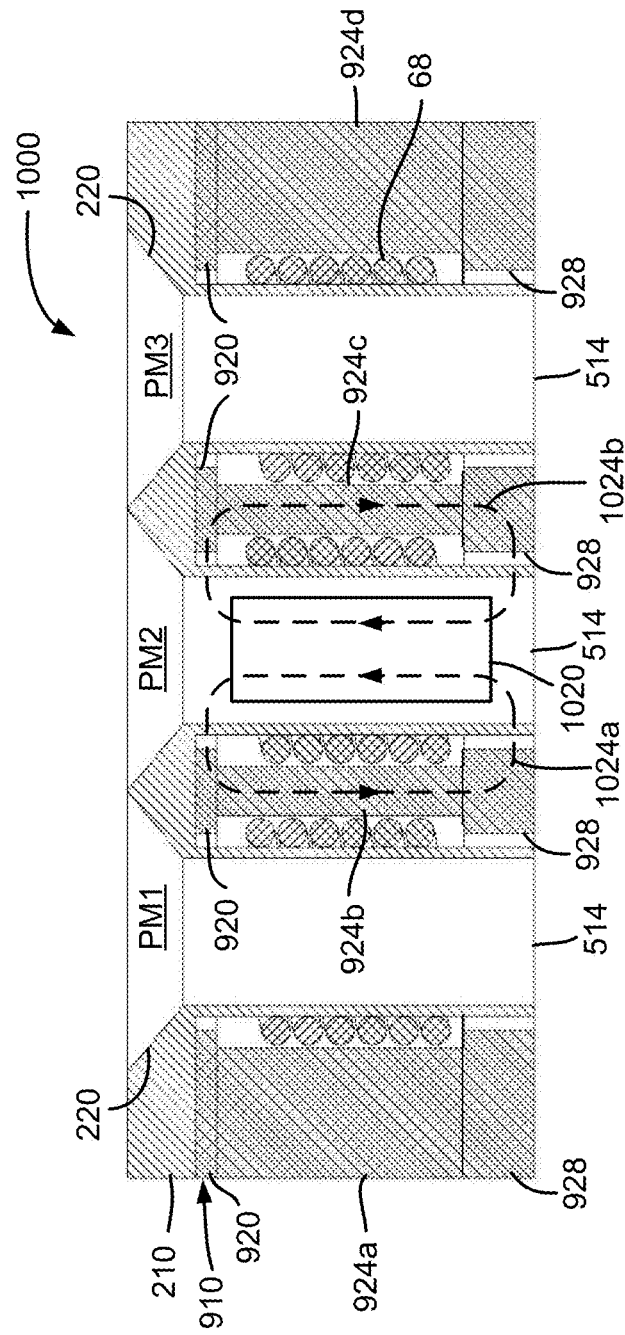
FIG. 11c is a diagrammatic view, in elevation, of the embodiment of the system of FIG. 11b, shown here to illustrate additional details of the embodiment of the flux return path.

Attention is now directed to FIG. 11*c* in conjunction with FIG. 11*b*. FIG. 11*c* is a partially cut-away diagrammatic view, in elevation, of system embodiment 1000 of FIG. 11*b*, shown here to illustrate additional details of its structure. The partially cut-away view is the same as that of FIG. 11*b*, but taken from a different perspective to diagrammatically illustrate, by way of non-limiting example, suitable positions for a plurality of individual posts or members that can make up an overall coupling flux return path. Each post or member is designated using the reference number 924 with an appended alphabetical character. Accordingly, a number of flux return members are individually designated as 924*a*-924*d*. Each post or member can include any suitable shape in lateral extent, including a cylindrical shape or more complex shape. In this figure, it is straightforward to see the example magnetic field closure path for a Faraday element 1020 located in PM2 and diagrammatically shown as a rectangle. Example flux lines are designated by the reference numbers 1024*a* and 1024*b* and shown as dashed lines. Starting at the top of Faraday element 1020, the magnetic field (flux) can follow a path into to top flux return sheet 920 on either side, down through adjacent members 924*b* and 924*c* of coupling flux return 924 into bottom flux return sheet 928 and out from the bottom flux return sheet into the bottom end of Faraday element 1020 in the view of the figure.

Figure 12:
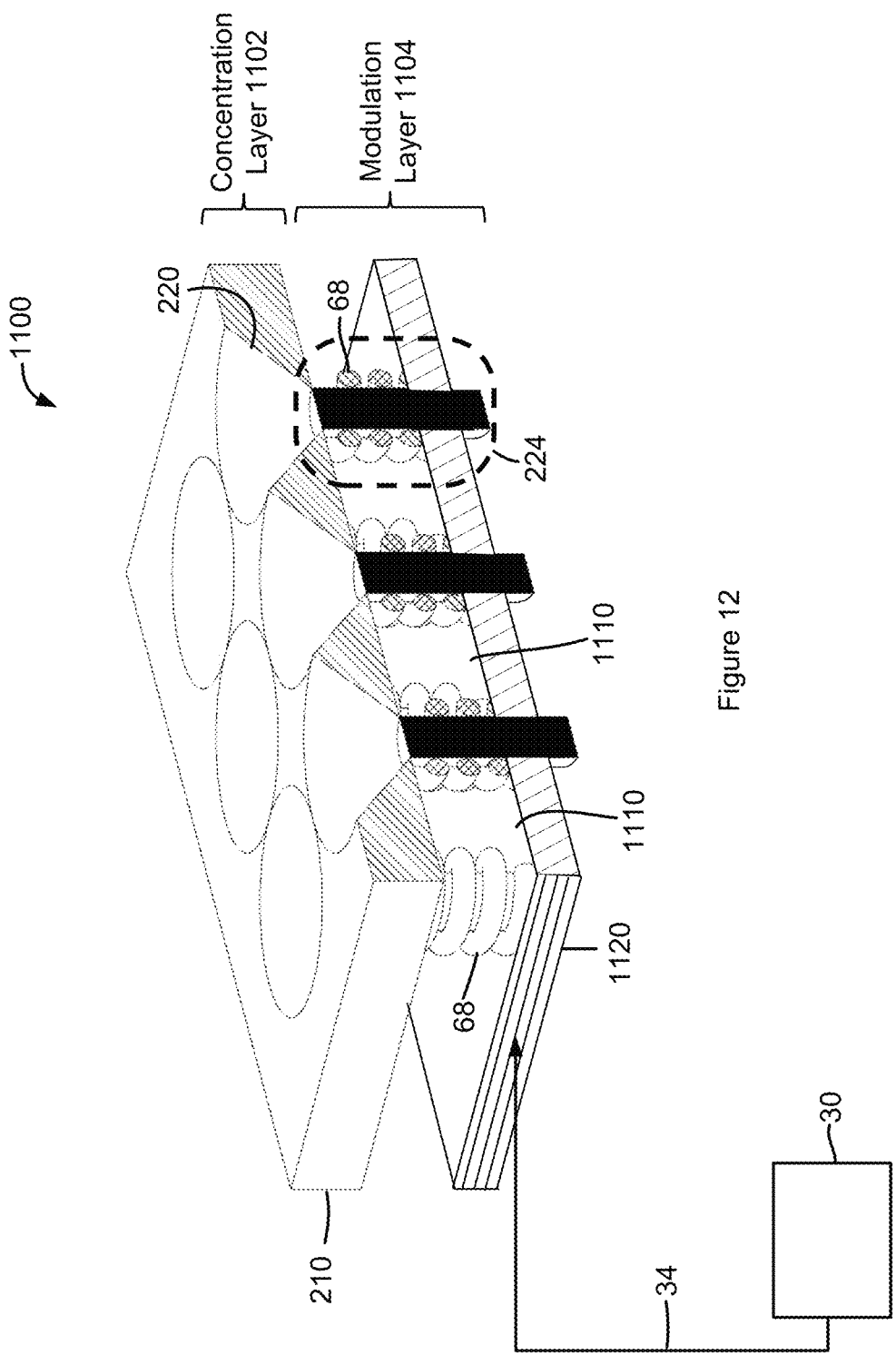
FIG. 12 is a diagrammatic view, in perspective, that illustrates an embodiment of a spatial light modulator system implemented in accordance with the present disclosure including a printed circuit board that supports components of the system and also at least provides electrical interconnectivity.

FIG. 12 is a diagrammatic view, in partially cut-away perspective, that illustrates another embodiment of an advanced spatial light modulator system implemented in accordance with the present disclosure and generally indicated by the reference number 1100. In this system embodiment, a concentration layer 1102 is included, made up of an array of horns 220, and a modulation layer 1104 made up of a plurality of modulators 224 (six of which are shown) each including a Faraday element surrounded by a coil. As is the case with embodiments described above, concentration layer 1102, by concentrating the light of a larger input aperture into a smaller modulator aperture, creates lateral room or interstitial gaps 1110 between advanced pixel modulators 224 of the modulation layer. In this embodiment, this space is partly used by a printed circuit board (PCB) 1120 to which coils 68 can be physically and electrically connected. This simplifies assembly by allowing the coils to be fabricated separately and not wound directly on each magneto-optical modulator. That is, coils 68 can be assembled in place on the PCB using well-known and low-cost PCB assembly processes and machines, and interconnections 34 of the coils to SLM controller 30 to be incorporated into PCB 1120.

In another embodiment, the drivers of the SLM Controller can be incorporated onto the PCB, shortening the interconnection distance from a driver to an associated coil and thus allowing higher switching speeds and lower power as well as the manufacturability improvements. In other embodiments, with sufficient integration of function onto Integrated Circuits (ICs) and/or the use of a plurality of PCBs, the entire SLM controller can be implemented within the PCB. In still another embodiment, coils 68 can be implemented as conductors on the PCB, such as by the use of multiple layer PCBs and/or spirals of conductors on each PCB layer. The thickness of the conductors can be increased on these PCB layers or sections of PCB layers by well-known techniques such as, for example, plating.

The foregoing description of the invention has been presented for purposes of illustration and description. It is not intended to be exhaustive or to limit the invention to the precise form or forms disclosed, and other modifications and variations may be possible in light of the above teachings. For example, selected features taken from the various embodiments shown in the figures can be combined in any suitable manner. As another example, other embodiments can use other types of modulators rather than magneto-optic modulators either currently available or yet to be developed while applying the teachings that have been brought to light herein. Suitable types of modulators include but are not limited to magneto-optic, electro-optic such as Pockel cells, electrochromic, polarization modulation using graphene, mechanical shutters, metamaterial (see, for example, a publication by Claire M. Watts, et al., entitled Terahertz Compressive Imaging with Metamaterial Spatial Light Modulators, Nature Photonics, Vol. 8, August 2014). One suitable array of magneto-optic modulators is described as part of the spatial light modulator disclosed in commonly owned U.S. Pat. No. 10,345,631, entitled SOLID STATE SPATIAL LIGHT MODULATOR, which is hereby incorporated by reference. Accordingly, those of skill in the art will recognize certain modifications, permutations, additions and sub-combinations of the embodiments described above.

What is claimed is:

1. A spatial light modulator system, comprising:
   a concentration layer including an array of optical concentrators, each optical concentrator formed as a horn including a planar concentrator input area and a concentrator output area that is smaller than the planar concentrator input area such that each concentrator concentrates a portion of an input light beam received at the planar concentrator input area into the concentrator output area, each horn including an output end defining the concentrator output area; and
   a modulation layer including an array of light modulators with each light modulator having a modulator input area that is supported in optical communication with the concentrator output area of one of the optical concentrators for modulating said portion of the input light beam and said light modulators are spaced apart from one another in the modulation layer based on a ratio of the planar concentrator input area to the modulator input area to form gaps between adjacent ones of the light modulators in the array of light modulators each light modulator including a modulator core including a Faraday material formed as a Faraday post having opposing ends such that a first end of the Faraday post defines the modulator input area confronting the concentrator output area of a given one of the horns and the first end of the Faraday post supports a dielectric post at least partially within an interior volume of the given one of the horns but not completely filling the horn.

2. The spatial light modulator system of claim 1 wherein each light modulator includes a given Faraday material having a lateral area and a thickness such that the lateral area corresponds to the modulator input area and said lateral area is larger than the concentrator output area.

3. The spatial light modulator system of claim 1 wherein each light modulator includes a given Faraday material having a lateral area and a thickness such that the lateral area corresponds to the modulator input area and the lateral area in cooperation with the thickness causes the Faraday material to exhibit a single stable magnetic domain.

4. The spatial light modulator system of claim 1 wherein each light modulator includes a given Faraday material having a lateral area and a thickness, said lateral area corresponding to the concentrator input area and having said thickness that causes the Faraday material to be magnetically unstable and form more than one magnetic domain.

5. The spatial light modulator system of claim 1 wherein a free end of the dielectric post supports an anti-reflection layer.

6. The spatial light modulator system of claim 1 wherein the dielectric post extends from the Faraday post through the concentrator output area of the given one of the optical concentrators.

7. The spatial light modulator system of claim 6, further comprising:
   an electrically conductive coil surrounding the Faraday post: and
   a waveguide interposed between the modulator core and the electrically conductive coil.

8. The spatial light modulator system of claim 7 wherein the electrically conductive coil defines a cylindrical peripheral outline.

9. The spatial light modulator system of claim 1 wherein the aforerecited dielectric post is a first dielectric post that directly contacts the end of the Faraday post and the modulator core further includes a second dielectric post supported by an opposing end of the Faraday post, opposite the first dielectric post, that directly contacts the opposing end of the Faraday post such that the Faraday post is sandwiched between the first dielectric post and the second dielectric post.

10. The spatial light modulator system of claim 9 wherein a free end of the second dielectric post, opposite the Faraday post, supports an anti-reflection layer.

11. The spatial light modulator system of claim 1 wherein said Faraday post is a cylinder extending between the opposing ends.

12. The spatial light modulator system of claim 1 further comprising:
   one of a plurality of electrically conductive coils surrounding each modulator core for controlling a magnetic state of the Faraday material responsive to control signals and said electrically conductive coil is supported within at least one of said gaps.

13. The spatial light modulator system of claim 12 further comprising:
   a printed circuit board that supports the electrically conductive coil of each modulator core in the array of spatial light modulators and which is in electrical communication with each electrically conductive coil for coupling said control signals thereto.

14. The spatial light modulator system of claim 13 wherein the printed circuit board defines a modulator core aperture that receives the modulator core of each spatial light modulator.

15. The spatial light modulator system of claim 14 wherein the Faraday material of each light modulator passes through one of the modulator core apertures defined by the printed circuit board.

16. The spatial light modulator system of claim 1 wherein each light modulator includes a coil surrounding each modulator core and supported within at least one of said gaps for producing a magnetic flux through the Faraday material to control a magnetic state of the Faraday material responsive to control signals; and a flux return system including an arrangement of soft magnetic material to provide a flux return path external to the modulator core of each light modulator and extending between the first end of the Faraday material and a second end of the Faraday material.

17. The spatial light modulator system of claim 16 wherein the flux return system includes a tubular flux return member that surrounds the modulator core of each light modulator.

18. The spatial light modulator system of claim 17 wherein the tubular flux return member is cylindrical and elongated.

19. The spatial light modulator system of claim 17 wherein the tubular flux return member includes first and second opposing ends and a first flux return member is supported at a selected one of the first opposing end and the second opposing end to at least partially close the selected one of the first opposing end and the second opposing end, and the first flux return member defines a first aperture through which the modulator core passes for each light modulator.

20. The spatial light modulator system of claim 19 further comprising:
a second flux return member supported at an opposite one of the first opposing end and the second opposing end of the tubular flux return member to at least partially close the opposite one of the first opposing end and the second opposing end and the second flux return member defining a second aperture through which the modulator core passes for each light modulator.

21. The spatial light modulator system of claim 16 wherein the flux return system includes a first flux return sheet defining a first plurality of modulator core apertures receiving the array of light modulators such that the first flux return sheet is in magnetic flux communication with the first end of the Faraday material of each light modulator.

22. The spatial light modulator system of claim 21 wherein the flux return system includes a second flux return sheet defining a second plurality of modulator core apertures receiving the array of light modulators such that the second flux return sheet is in magnetic flux communication with the second end of the Faraday material of each light modulator.

23. The spatial light modulator system of claim 22 wherein the flux return system includes a plurality of flux return members for conducting the magnetic flux between the first flux return sheet and the second flux return sheet and positioned between the light modulators in the array of light modulators.

24. The spatial light modulator system of claim 1 further comprising: an exit layer including an array of optical elements in optical communication with the array of light modulators, each optical element including an input area and an output area that is larger than the input area such that each optical element expands a modulated output light beam received from an associated modulator in the array of light modulators.

25. The spatial light modulator system of claim 24 wherein the exit layer includes an exit horn array made up of a plurality of exit horns such that each exit horn corresponds to one of the optical elements.

26. The spatial light modulator system of claim 25, further comprising: a dielectric material filling a cavity defined by each exit horn.

27. The spatial light modulator system of claim 26, further comprising: an anti-reflection layer supported by the dielectric material of each exit horn.

28. The spatial light modulator system of claim 25 wherein a second end of the Faraday post supports an exit dielectric post at least partially within an interior volume of one of the exit horns.

29. The spatial light modulator system of claim 28 wherein a free end of the exit dielectric post supports an anti-reflection layer.

30. The spatial light modulator system of claim 29 wherein the exit dielectric post extends from the Faraday post through an input area of one of the exit horns.

31. The spatial light modulator system of claim 24 wherein the exit layer includes an array made up of a plurality of concave lenses such that each concave lens of the array corresponds to one of the optical elements.

32. A method for producing a spatial light modulator system, said method comprising:
forming a concentration layer including an array of optical concentrators, each optical concentrator formed as a horn including a planar concentrator input area and a concentrator output area that is smaller than the planar concentrator input area such that each concentrator concentrates a portion of an input light beam received at the planar concentrator input area into the concentrator output area, each horn including an output end defining the concentrator output area; and
arranging a modulation layer to include an array of light modulators with each light modulator having a modulator input area that is supported in optical communication with the concentrator output area of one of the optical concentrators for modulating said portion of the input light beam and said light modulators are spaced apart from one another in the modulation layer based on a ratio of the planar concentrator input area to the modulator input area to form gaps between adjacent ones of the light modulators in the array of light modulators, each light modulator including a modulator core including a Faraday material formed as a Faraday post having opposing ends such that a first end of the Faraday post defines the modulator input area confronting the concentrator output area of a given one of the horns and the first end of the Faraday post supports a dielectric post at least partially within an interior volume of the given one of the horns, but not completely filling the horn.

33. A method for modulating an input light beam in a spatial light modulator system, said method comprising:
arranging a concentration layer to include an array of optical concentrators, each optical concentrator formed as a horn including a concentrator input area and a concentrator output area that is smaller than the concentrator input area such that each concentrator concentrates a portion of an input light beam received at the concentrator input area into the concentrator output area, each horn including an output end defining the concentrator output area; and
configuring a modulation layer to include an array of light modulators with each light modulator having a modulator input area that is supported in optical communication with the concentrator output area of one of the optical concentrators to modulate said portion of the input light beam and spacing apart the light modulators from one another in the modulation layer based on a ratio of the concentrator input area to the modulator input area to form gaps between adjacent ones of the light modulators in the array of light modulators, each light modulator including a modulator core including a Faraday material formed as a Faraday post having opposing ends such that a first end of the Faraday post defines the modulator input area confronting the concentrator output area of a given one of the horns and the first end of the Faraday post supports a dielectric post at least partially within an interior volume of the given one of the horns, but not completely filling the horn.

\* \* \* \* \*